United States Patent
Elzur

(10) Patent No.: US 9,384,025 B2
(45) Date of Patent: Jul. 5, 2016

(54) TRAFFIC AND/OR WORKLOAD PROCESSING

(71) Applicant: Intel Corporation, Santa Clara, CA (US)

(72) Inventor: Uri Elzur, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 14/134,982

(22) Filed: Dec. 19, 2013

(65) Prior Publication Data

US 2014/0215465 A1 Jul. 31, 2014

Related U.S. Application Data

(63) Continuation-in-part of application No. 13/751,932, filed on Jan. 28, 2013.

(51) Int. Cl.
*G06F 15/173* (2006.01)
*G06F 9/455* (2006.01)
*H04L 12/24* (2006.01)

(52) U.S. Cl.
CPC ........ *G06F 9/45533* (2013.01); *G06F 9/45558* (2013.01); *H04L 41/0893* (2013.01); *G06F 2009/45595* (2013.01); *G06F 2209/509* (2013.01)

(58) Field of Classification Search
CPC ............ H04L 67/1002; H04L 61/1511; H04L 63/166; H04L 63/0272; H04L 67/2814
See application file for complete search history.

(56) References Cited

U.S. PATENT DOCUMENTS

| 5,692,193 | A | 11/1997 | Jagannathan et al. |
| 6,243,667 | B1 | 6/2001 | Kerr |
| 7,043,659 | B1 | 5/2006 | Klein et al. |
| 7,607,007 | B2 | 10/2009 | Stanford-Clark |
| 8,797,867 | B1 | 8/2014 | Chen |
| 8,875,223 | B1 * | 10/2014 | Chen et al. .................. 726/1 |
| 2008/0027947 | A1 * | 1/2008 | Pritchett et al. ............ 707/10 |
| 2008/0282253 | A1 | 11/2008 | Huizenga |
| 2010/0211946 | A1 | 8/2010 | Elzur |

(Continued)

FOREIGN PATENT DOCUMENTS

WO 2014/077904 A1 5/2014
WO 2014/117081 A2 7/2014

OTHER PUBLICATIONS

Apostol et al., "Policy Based Resource Allocation in Cloud Systems", 2011 International Conference on P2P, Parallel, Grid, Cloud and Internet Computing, IEEE, 2011 pp. 285-288.

(Continued)

*Primary Examiner* — Peling Shaw
(74) *Attorney, Agent, or Firm* — Christopher K. Gagne

(57) ABSTRACT

In this embodiment, techniques are provided that may permit operations performed by hardware and software to process one or more (e.g., network traffic-related) workloads to be coordinated, at least in part. Such coordination may permit this embodiment to operate in accordance with one or more advantageous usage models, and/or to achieve advantages such as, accelerated network traffic processing, while permitting and/or facilitating a multi-tenant (e.g., software-defined) network environment to be provided, for example, via enforcement of one or more associated policies. Many modifications are possible without departing from this embodiment.

25 Claims, 5 Drawing Sheets

(56) References Cited

U.S. PATENT DOCUMENTS

| | | |
|---|---|---|
| 2010/0223397 A1 | 9/2010 | Elzur |
| 2010/0287262 A1 | 11/2010 | Elzur |
| 2010/0318652 A1* | 12/2010 | Samba .................. 709/224 |
| 2011/0010581 A1 | 1/2011 | Tanttu et al. |
| 2011/0032944 A1 | 2/2011 | Elzur |
| 2011/0035498 A1 | 2/2011 | Shah et al. |
| 2011/0078679 A1 | 3/2011 | Bozek et al. |
| 2011/0185076 A1 | 7/2011 | Elzur et al. |
| 2011/0219118 A1 | 9/2011 | Cowan et al. |
| 2011/0239010 A1 | 9/2011 | Jain et al. |
| 2011/0243553 A1 | 10/2011 | Russell |
| 2011/0270968 A1 | 11/2011 | Salsburg et al. |
| 2011/0292792 A1 | 12/2011 | Zuo et al. |
| 2011/0320606 A1 | 12/2011 | Madduri et al. |
| 2012/0016970 A1 | 1/2012 | Shah et al. |
| 2012/0163180 A1 | 6/2012 | Goel |
| 2012/0179824 A1 | 7/2012 | Jackson |
| 2012/0239739 A1 | 9/2012 | Manglik et al. |
| 2013/0034015 A1 | 2/2013 | Jaiswal et al. |
| 2013/0086235 A1 | 4/2013 | Ferris |
| 2013/0103834 A1 | 4/2013 | Dzerve |
| 2013/0124702 A1 | 5/2013 | Shah et al. |
| 2013/0174157 A1 | 7/2013 | Elzur |
| 2013/0268646 A1 | 10/2013 | Doron |
| 2014/0033275 A1 | 1/2014 | Kawamoto |
| 2014/0119239 A1 | 5/2014 | Hu |
| 2014/0136706 A1 | 5/2014 | Elzur |
| 2014/0137182 A1 | 5/2014 | Elzur |
| 2014/0189074 A1 | 7/2014 | Parker |
| 2014/0215036 A1 | 7/2014 | Elzur |
| 2014/0215465 A1 | 7/2014 | Elzur |

OTHER PUBLICATIONS

International Search Report and Written Opinion received for PCT Patent Application No. PCT/US2013/046123, mailed on Oct. 31, 2013, 9 pages.
International Search Report and Written Opinion received for PCT Patent Application No. PCT/US2014/013184, mailed on Aug. 30, 2014, 9 pages.
VMware Information Guide, "VMware Virtual Networking Concepts", Revision: 20070718 Item: IN-018-INF-01-01, 2007, 12 pages.
Notice of Allowance received for U.S. Appl. No. 13/675,324, mailed on Nov. 10, 2014, 15 pages.
Non-final Office Action mailed Dec. 17, 2014 in U.S. Appl. No. 13/751,932, 47 pages.
Written Opinion of the International Searching Authority dated Aug. 30, 2014 for PCT Application No. PCT/US2014/013184 (4 pages).
International Preliminary Report on Patentability dated Jul. 28, 2015 for PCT Application No. PCT/US2014/013184 (5 pages).
International Search Report dated Aug. 30, 2014 for PCT Application No. PCT/US2014/013184 (3 pages).
Office Action (and related attachments) dated Dec. 31, 2015 in U.S. Appl. No. 13/751,932 (65 pages).
Office Action dated Mar. 10, 2016 in Korean Patent Application No. 10-2015-7014167 (7 pages with 5 pages summarized English translation).

* cited by examiner

TRAFFIC AND/OR WORKLOAD PROCESSING

CROSS-REFERENCE TO RELATED APPLICATIONS

This application is a continuation-in-part of co-pending U.S. patent application Ser. No. 13/751,932 filed 28 Jan. 2013.

TECHNICAL FIELD

This disclosure relates to traffic and/or workload processing.

BACKGROUND

In one conventional arrangement, the resources of a distributed computing system are shared among multiple users. The resources are shared, using virtualization and/or other (e.g., physically-based) techniques, in accordance with usage policies derived from user service agreements. In this conventional arrangement, such usage policies are either set in a centralized fashion by a centralized control mechanism remote from an individual respective computing node in the system, or in a localized fashion by respective localized control mechanisms at each respective computing node, but enforcement may take place at the local computing nodes.

These resources typically include hardware and software resources that provide and/or impart various kinds of processing to packets received by the system, and/or provide other capabilities, such as various services, appliances, and offload processing. Depending upon the configuration of the distributed computing system, the computing nodes to which these resources are assigned, and their respective workloads, configurations, etc., are selected either by the centralized control mechanism or the localized control mechanisms. The compute nodes may be connected via a physical network that may employ switches or other network devices. If a given packet is to undergo multiple kinds of processing by multiple resources, the packet is forwarded to and among the multiple resources.

Unfortunately, the above conventional arrangement suffers from certain disadvantages and drawbacks. For example, although the processing that is to be imparted to the packets can be individualized on a per-user, per-policy basis, etc., the specific manner in which the policies, processing, and resource configuration/locations are implemented in the system typically is not coordinated in a fashion that meaningfully facilitates or improves system processing efficiency. For example, without such meaningful coordination, resulting traffic and/or processing patterns in the system may result in overuse, underuse, or thrashing of the switch, various resources (e.g., compute, network, storage, energy, etc. resources), and/or certain ports of the switch and/or the various resources. Alternatively or additionally, without such meaningful coordination, traffic may undesirably "bounce" among the switch and/or certain resources, or take an undesirably large number of hops in the network. This may result in excessive bandwidth usage, higher latency, and/or may make latency control more difficult (e.g., leading to jitter).

The above conventional arrangement suffers from additional disadvantages and/or drawbacks. For example, the above conventional system may not be able to provide real time or near real time fine granularity for quality of service adjustments to be made to, and/or statistically accurate visibility of workloads and/or resource utilizations, as the workloads and/or utilizations change in and/or among the computing nodes. This is especially true in cases where the adjustments to and/or visibility into such workloads and/or utilizations are to be accomplished on a per user/workload basis in adherence to the user service agreements.

A further drawback of this conventional arrangement is that it affords relatively little in the way of processing/policy flexibility and dynamic processing capabilities, for example, depending upon the particular contents of received packets. For example, in at least certain circumstances, it would be useful to be able to modify or adjust resources assigned to the traffic, location of resources, policies, processing, processing order, and/or processing resource configuration/locations that are applicable to and/or to be used in connection with received packets, based upon the particular contents of the received packets, compute resources, storage resources, affinity and/or association with other infrastructure resources and/or services, and/or their relative location with respect to the locus at which network services are to be provided. It would also be useful not to preclude other services, e.g. compute, from being the pivot around which other services, infrastructure allocation, and/or placement decisions may be made. Additional drawbacks of this conventional arrangement include inability to reduce to the extent desirable processing and packet transmission latency and jitter.

One proposed solution that involves processing in hardware of network packets is disclosed in Peripheral Component Interconnect (PCI) Special Interest Group (SIG) Single Root Input/Output Virtualization (SR-IOV) and Sharing Specification Revision 1.1, published Jan. 20, 2010 (hereinafter, "SR-IOV specification"). Unfortunately, this proposed solution effectively eliminates the ability of vSwitch and/or other software processes (e.g., hypervisor and/or virtual machine monitoring processes) to be able to directly affect and/or control packet processing by the hardware. This eliminates the ability to add local control, services, and/or policies to be coordinated with the hypervisor, virtual machine manager and/or vSwitch. Indeed, there is no contemplation in SR-IOV of such vSwitch, other software processes, and/or policies being involved in the steering of packets to and/or among processing entities, and/or in the control, adaptation, and/or modification of such steering and/or processing (e.g., in a dynamic fashion and/or based upon changed processing criteria, parameters, preferences, etc.). Additionally, the local or remote entity that may govern the infrastructure may be severely challenged with respect to being able to adequately control the amount of shared resources (e.g., network bandwidth and/or priority) that may be provided to platform elements (e.g., virtual machines) and/or in coordinating such provision with and/or among other users (e.g., other virtual machines vying for appropriate network access, network priority, and/or latency). This reduces the processing flexibility and/or services that may be provided in this conventional arrangement, and/or may involve use of SR-IOV hardware to provide all such services (which may be unrealistic). Furthermore, the SR-IOV techniques do not contemplate provision of services on a fine granularity (e.g., other than a virtual machine or PCI-Express function), such as, per-flow basis, and/or support the ability of software processes to modify, combine, and/or tailor hardware processing/capabilities.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
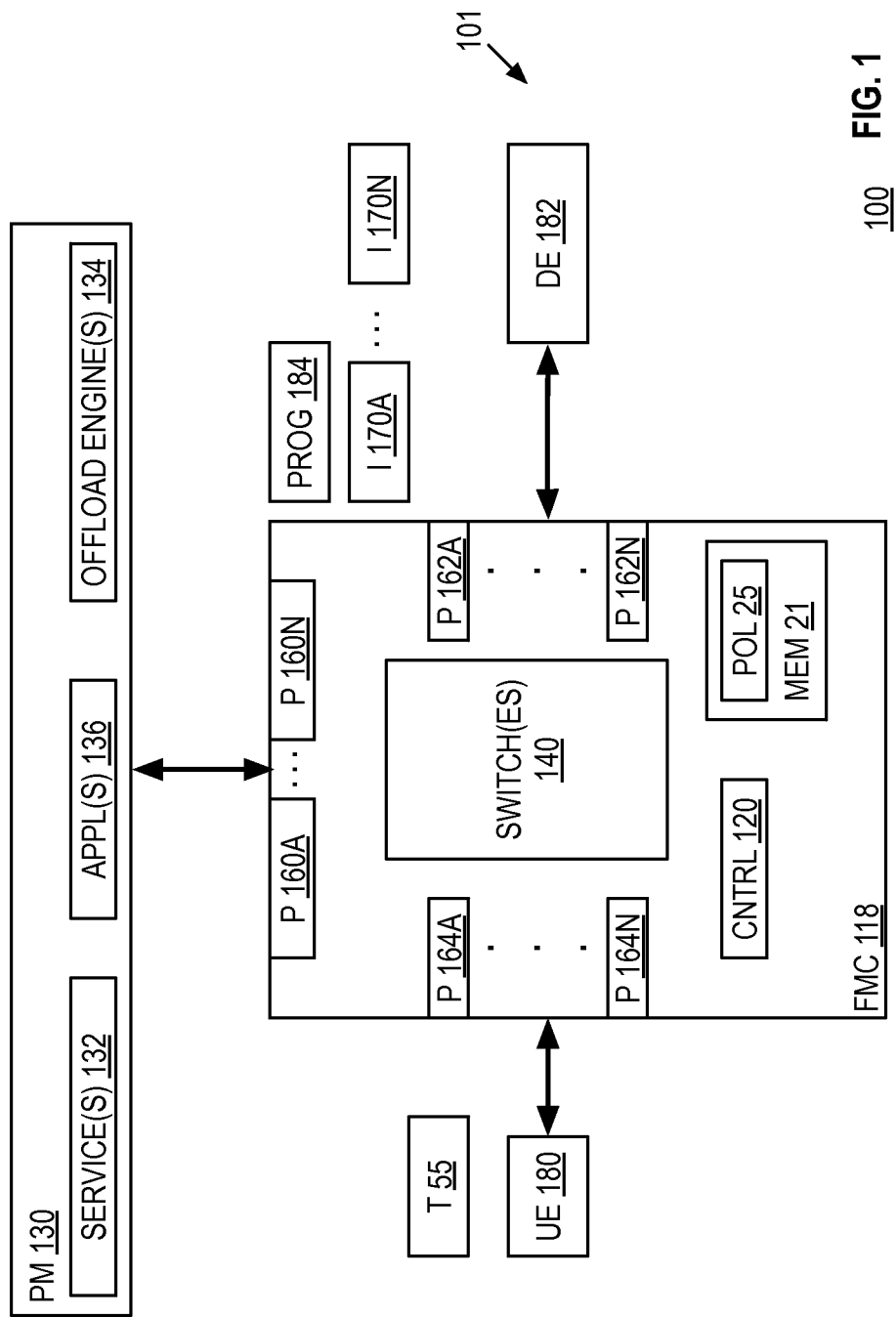
FIG. 1 illustrates a system embodiment.

FIG. 1 illustrates a system embodiment 100. System 100 may include one or more software-defined networks (SDN) 101. SDN 101 may be, comprise, be comprised in, and/or be associated with, at least in part, e.g., one or more cloud computing environments (CCE) that may facilitate, at least in part, implementation of one or more (not shown, and in this embodiment, a plurality of) virtual and/or isolated computing environments to be associated with and/or used by, at least in part, one or more (and in this embodiment, a plurality of) users, tenants, etc. in accordance with and/or as per, at least in part, one or more (and in this embodiment, a plurality of) policies 25. These policies 25 may arise out, embody, and/or facilitate implementation of, at least in part, one or more (and in this embodiment a plurality of) service arrangements. Additionally or alternatively, in this embodiment, one or more translation mechanisms may be employed, for example, to facilitate translation, at least in part, between (on the one hand) one or more relatively high level policy-related descriptors and/or definitions related to, for example, one or more service arrangements, service agreements, etc., and (on the other hand) one or more relatively lower level (e.g., infrastructure oriented) policies that may be derived, at least in part, from the one or more service arrangements, service agreements, etc. Additionally or alternatively, without departing from this embodiment, embodiment 100 may comprise, at least in part, one or more other and/or additional types of networks (e.g., other than and/or in addition to SDN 101.

In this embodiment, SDN 101 may comprise, at least in part, forwarding mechanism circuitry (FMC) 118 and/or one or more (and in this embodiment a plurality of) processing mechanisms 130. FMC 118 may comprise ports 164A . . . 164N, 162A . . . 162N, and/or 160A . . . 160N. One or more upstream (e.g., relative to SDN 101, one or more downstream communicating entities 182, and/or FMC 118) communicating entities 180 may be communicatively coupled to FMC 118 via one or more of the ports 164A . . . 164N. Processing mechanisms 130 may be communicatively coupled to FMC 118 via one or more of the ports 160A . . . 160N. One or more downstream (e.g., relative to SDN 101, one or more upstream communicating entities 180, and/or FMC 118) communicating entities 182 may be communicatively coupled to FMC 118 via one or more of the ports 162A . . . 162N.

FMC 118 may comprise, at least in part, one or more virtual and/or physical switches 140, one or more controllers 120, and/or computer-readable memory 21. Memory 21 may comprise, at least in part, policies 25. One or more controllers 120 may be or comprise, for example, one or more SDN (and/or other type of) controllers. Additionally or alternatively, in this embodiment, one or more controllers 120 may be remote, at least in part, to FMC 118, and/or may be communicatively coupled, at least in part, to one or more switches 140 (e.g., in-band and/or out-of-band, at least in part).

Processing mechanisms 130 may comprise, at least in part, one or more SDN (and/or other type of) network services 132, one or more SDN (and/or other type of) applications 136, and/or one or more (e.g., hardware) offload engines 134.

In this embodiment, FMC 118, one or more switches 140 and/or one or more controllers 120 may exhibit (in whole or in part) the features, construction, and/or operations of the policy engine circuitry described in co-pending U.S. patent application Ser. No. 13/675,324, filed Nov. 13, 2012, entitled "Policy Enforcement In Computing Environment." Additionally or alternatively, the policies 25 and/or SDN 101 may exhibit (in whole or in part) the features, construction, and/or operations of the cloud computing environment and/or platform resource management policies, respectively, described in the aforesaid co-pending U.S. patent application. Without departing from this embodiment, although policy enforcement may be carried out, at least in part, by policy engine circuitry, it may additionally or alternatively be assisted and/or augmented by, for example, one or more resources that may be external to one or more end nodes (e.g., in one or more rack servers and/or other components).

In this embodiment, a policy may be and/or comprise, at least in part, (1) one or more rules, instructions, commands, processes, procedures, permissions, and/or interdictions, and/or (2) one or more goals and/or results that may be achieved and/or intended to be achieved as a result, at least in part, of implementing one or more rules, instructions, commands, processes, procedures, permissions, and/or interdictions. Also in this embodiment, enforcement of a policy may comprise, at least in part, implementation and/or execution of (1) one or more rules, instructions, commands, processes, procedures, permissions, and/or interdictions, and/or (2) achievement, at least in part, of one or more goals and/or results.

In this embodiment, a platform may be or comprise one or more physical, logical, and/or virtual computing entities, such as, for example, one or more hosts. Also in this embodiment, the terms host computer, host, platform, server, client, network node, and node may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a network may be or comprise any mechanism, instrumentality, modality, and/or portion thereof that permits, facilitates, and/or allows, at least in part, two or more entities to be communicatively coupled together. In this embodiment, a SDN may be or comprise a network that may have one or more features, configurations, capabilities, and/or operations that may be capable of being defined, established, maintained, and/or modified, at least in part, by, under control of, and/or using, at least in part, programming, and/or one or more (e.g., software) programs, application program interfaces (API), and/or processes.

In this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction and/or programming may include data and/or one or more commands. In this embodiment, a packet and/or frame may be or comprise one or more symbols and/or values. In this embodiment, traffic and/or network traffic may be or comprise one or more packets. In this embodiment, a communication link may be or comprise any mechanism that is capable of and/or permits, at least in part, at least two entities to be or to become communicatively coupled.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, forwarding mechanism circuitry may be and/or comprise, at least in part, circuitry that is capable, at least in part, of issuing, at least in part, one or more packets that have been received, at least in part, by the circuitry toward one or more (intermediate and/or ultimate) destinations (e.g., via and/or using one or more hops). In this embodiment, a forwarding operation and/or forwarding may be or comprising, at least in part, issuing, at least in part, one or more packets toward one or more (intermediate and/or ultimate) destinations (e.g., via and/or using one or more hops).

In this embodiment, a processor, host processor, central processing unit (CPU), processor core, core, and/or controller each may comprise respective circuitry capable of performing, at least in part, one or more arithmetic and/or logical operations, and/or of executing, at least in part, one or more instructions. In this embodiment, memory, cache, and cache memory each may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. In this embodiment, memory 21 may comprise one or more instructions that when executed by, for example, circuitry 118 (and/or one or more components thereof) and/or one or more other components of network 101 may result, at least in part, in circuitry 118 (and/or one or more components thereof) and/or one or more other components of network 101, performing, at least in part, the operations that are described herein as being performed, by circuitry 118 (one or more components thereof) and/or one or more other components of network 101. Of course, nothing herein should be viewed as limiting the scope of this embodiment. For example, without departing from this embodiment, these one or more instructions may be run in one or more processes/programs (not shown) that may reside, at least in part, in one or more user spaces/nodes (not shown).

In this embodiment, an offload engine may be or comprise circuitry to perform (e.g., in hardware) processing operations in lieu of those processing operations being performed, at least in part, by a CPU and/or software. For example, without limitation, a hardware offload engine may be or comprise circuitry that may be capable, at least in part, of performing, at least in part, in hardware, compression, decompression, security (e.g., secure socket layer, secure protocol, encryption, decryption, etc.), search and/or comparison (e.g., regular expression, etc.), and/or other operations. Although not shown in the Figures, one or more of the offload engines 134 may be comprised, at least in part, in the forwarding mechanism circuitry 118. Additionally or alternatively, one or more offload engines 134 may be communicatively coupled, at least in part, to one or more switches 140 via one or more of the ports 164A . . . 164N.

In this embodiment, a portion or subset of an entity may comprise all or less than all of the entity. In this embodiment, a set may comprise one or more elements. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions. In this embodiment, an API may be or comprise one or more physical, logical, and/or virtual interfaces via which (1) a first entity provide data and/or one or more signals, commands, instructions to a second entity that may permit and/or facilitate, at least in part, control, monitoring, and/or interaction, at least in part, with the second entity, and/or (2) the second entity may provide other data and/or one or more other signals that may permit and/or facilitate, at least in part, such control, monitoring, and/or interaction, at least in part.

In this embodiment, a computing environment may be or comprise circuitry capable, at least in part, of being used, alone and/or in combination with one or more other computing environments and/or entities, to perform, at least in part, one or more operations involved in, facilitating, implementing, related to, and/or comprised in one or more arithmetic, Boolean, logical, storage, networking, input/output (I/O), power management, energy management, and/or other computer-related operations. In this embodiment, a CCE may be or comprise a computing environment that is capable of providing one or more computer-related services in accordance with one or more service arrangements. In this embodiment, a service arrangement may be or comprise an agreement and/or contract between at least one entity that is to receive at least one service and at least one other entity that is to provide or to facilitate provision of the at least one service. In this embodiment, a service may comprise one or more functions, operations, instrumentalities, parameters, permissions, guarantees, interdictions, restrictions, limitations, and/or features involving, using, facilitated by, and/or implemented by, at least in part, one or more computing environments. Examples of such services may comprise, without limitations, computational, network, storage, I/O, webhosting, multimedia, video, audio, quality of service, security, power usage, network communication path selection, network congestion avoidance, and/or other services. In this embodiment, a user may be, comprise, and/or involve, at least in part, one or more human operators, one or more groups and/or associations of human operators, and/or one or more processes (e.g., application processes) associated with and/or that may be capable of being used directly or indirectly by one or more human operators, one or more groups and/or associations of human operators.

In this embodiment, interaction of a first entity with a second entity may be used interchangeably with interaction between the first and second entities. Also in this embodiment, such interaction may be, comprise, facilitate, and/or involve, at least in part, (1) provision, initiation of provision, and/or request for provision of one or more signals, commands, and/or data to the second entity by the first entity, and/or (2) one or more actions and/or changes in state of the second entity in response, at least in part, thereto.

For example, in this embodiment, service arrangements may be established that may be or comprise respective contracts between respective users (on the one side) and one or more entities (on the other side) that may maintain, operate, and/or own, at least in part, the SDN 101. These contracts may specify the respective sets of services and/or parameters of the respective sets of services that are to be provided to the users in and/or by the SDN 101. Policies 25 may be based, at least in part, upon these service arrangements such that, the enforcement, at least in part, of these policies 25 may result, at least in part, in the provision of these respective services to the users in accordance with the users' respective service arrangements and/or the parameters thereof.

Although not shown in the Figures, the individual processing mechanisms, services 132, applications 136, and/or offload engines 134 comprised in processing mechanisms 130 may be communicatively coupled to and/or among each other. Such communicative coupling may permit and/or facilitate, at least in part, transmission, reception, and/or transferal, at least in part, of one or more packets (e.g., received traffic 55) to, between, and/or among the processing mechanisms, 130 services 132, applications 136, virtual machines, and/or offload engines 134.

For example, in this embodiment, one or more controllers 120 may provide and/or issue programming 184 to one or more switches 140 and/or forwarding mechanism circuitry 118 that may result, at least in part, in one or more switches 140 and/or forwarding mechanism circuitry 118 performing one or more forwarding operations involving, at least in part, traffic 55 received, at least in part, by one or more switches 140 and/or forwarding mechanism circuitry 118. The one or more forwarding operations may be determined (e.g., by one or more switches 140 and/or circuitry 118) based at least in part upon the programming 184 provided, at least in part, by one or more controllers 120. Programming 184 may be based at least in part upon one or more policies 25. In this embodiment, such programming 184 may comprise multiple commands/instructions (and/or multiple sets of commands/instructions) separated, at least in part, in time, and/or a single respective set of commands/instructions at a single respective time, for respective received traffic.

In this embodiment, these one or more forwarding operations may be in accordance with one or more of at least the following four cases (a), (b), (c), and/or (d). Each of these cases (a) to (d) will now be briefly summarized, and thereafter, will be described in greater detail.

In case (a), after circuitry 118 and/or one or more switches 140 have previously forwarded, at least in part, at one or more previous times, the received traffic 55, the one or more forwarding operations may comprise again (e.g., subsequently) forwarding, at least in part, the received traffic 55 (e.g., by one or more switches 140 and/or forwarding mechanism circuitry 118) to one or more of the processing mechanisms 130 to permit these one or more of the processing mechanisms 130 to process, at least in part, the received traffic 55. This subsequent forwarding, at least in part, of the received traffic 55 may be based, at least in part, upon (1) which of one or more of the ports 164A . . . 164N the received traffic 55 was previously (at least partially) received, (2) at least one portion (e.g., 232 in FIG. 2) of the contents (e.g., 230 in FIG. 2) of the received traffic 55, and/or (3) the programming 184.

In case (b), after repeatedly receiving, at least in part, at respective times, the received traffic via at least one given port (e.g., comprised in the ports 164A . . . 164N), the one or more forwarding operations may comprise respectively forwarding, at least in part, the received traffic 55 to different ones of the processing mechanisms 130. In case (c), the one or more forwarding operations may comprise multiple forwarding operations to forward, at least in part, the received traffic to multiple of the processing mechanisms 130 in a sequence order that may permit a combined processing to be carried out that satisfies one or more of the policies 25.

In case (d), the one or more forwarding operations may comprise providing, at least in part, in association, at least in part, with the received traffic 55, one or more indications 170A . . . 170N of one or more processing operations that may be associated, at least in part, with one or more of the processing mechanisms 130. The one or more indications 170A . . . 170N may be used, at least in part, in a subsequent forwarding operation (e.g., carried out, at least in part, by the one or more switches 140 and/or forwarding mechanism circuitry 118).

Figure 2:
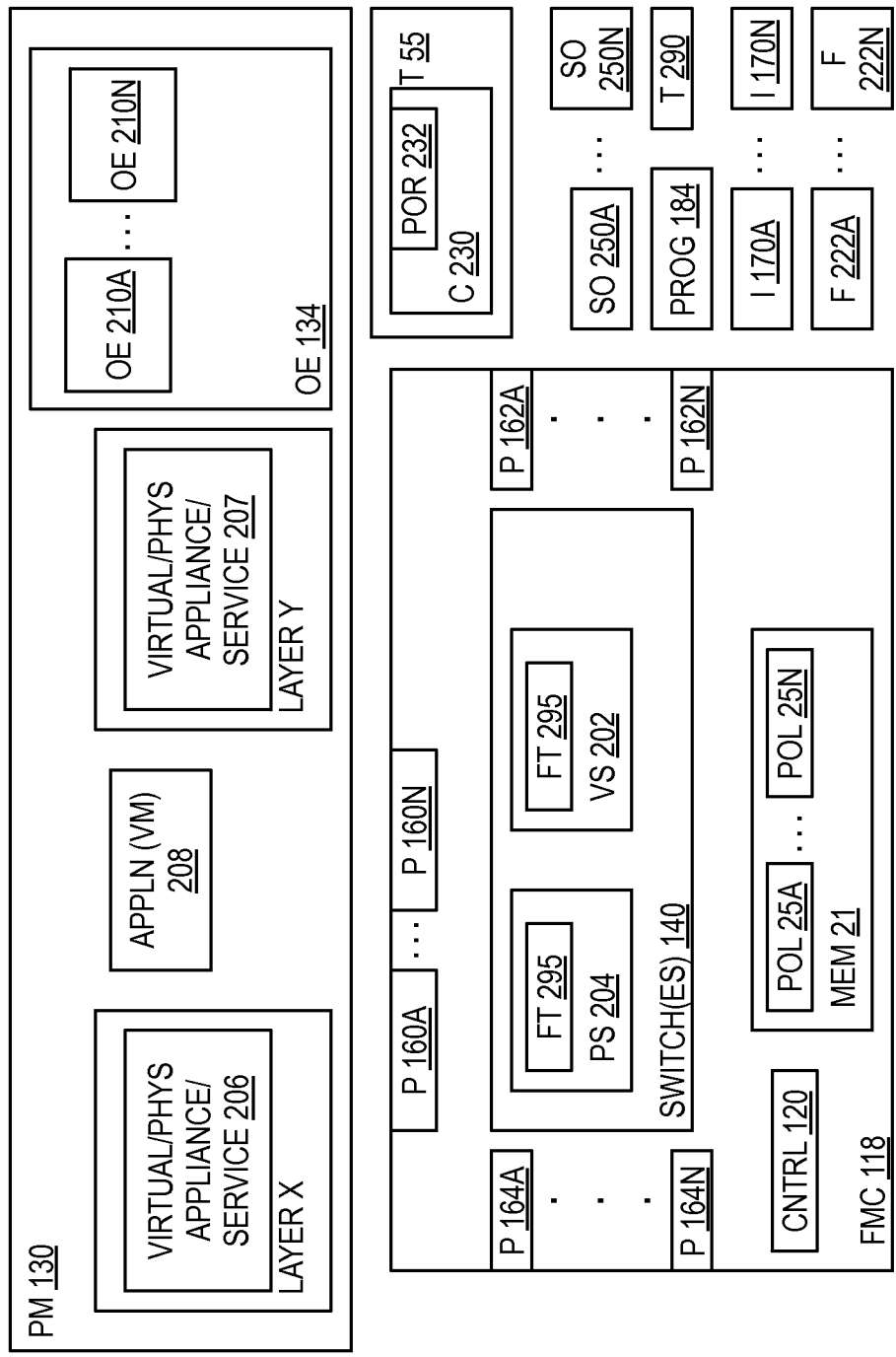
FIG. 2 illustrates features in an embodiment.

For example, in this embodiment, as shown in FIG. 2, processing mechanisms 130 may comprise, at least in part, one or more virtual and/or physical appliances and/or network services 206, one or more applications 208, one or more virtual and/or physical appliances and/or network services 207, and/or one or more offload engines 134. In this embodiment, one or more offload engines 134 may comprise a plurality of offload engines 210A . . . 210N that may implement different (e.g., respective) types of offload operations (e.g., different respective hardware-implemented compression, decompression, security, search and/or comparison, and/or other operations). Policies 25 may comprise a plurality of policies 25A . . . 25N (see FIG. 2). In this embodiment, one or more appliances/services 206 and one or more appliances/services 207 may be, and/or operate in and/or at, different respective processing/protocol layers (e.g., denoted by "X" and "Y" respectively in FIG. 2).

One or more controllers 120 may generate and/or issue, at least in part, programming 184 to one or more switches 140, based at least in part upon and/or in accordance with, at least in part, policies 25A . . . 25N. For example, programming 184 may control, at least in part, operation of one or more virtual switches 202 and/or one or more physical switches 204 so as to result, at least in part, in one or more switches 202 and/or 204 performing the one or more forwarding operations in the manner described herein as being performed by one or more switches 140. Additionally or alternatively, programming 184 may control, at least in part, one or more virtual switches 202 such that one or more switches 202 may control, at least in part, the operation of one or more switches 204 so as to result, at least in part, in one or more switches 204 performing the one or more forwarding operations in the manner described herein as being performed by one or more switches 140.

For example, one or more switches 140 may perform the one or more forwarding operations based at least in part upon and/or in accordance with, at least in part, these policies 25A . . . 25N. In this embodiment, each of the policies 25A . . . 25N may be established based at least in part upon one or more of the following (and/or other parameters/factors): (1) one or more SDN tenants/service arrangements that may be associated, at least in part, with received traffic 55, (2) one or more sources of the received traffic 55 (e.g., one or more upstream entities 180 and/or one or more of the ports 164A . . . 164N via which the received traffic 55 is received by the one or more switches 140), (3) one or more destinations of the received traffic 55 (e.g., one or more downstream entities 182 and/or one or more of the ports 162A . . . 162N via which the received traffic 55 is to be issued from the one or more switches 140), (4) one or more expected uses of and/or to which the received traffic 55 is expected to be put (e.g., after having been processed and/or as a result of processing by one or more of the processing mechanisms 130), (5) one or more flows to which the received traffic 55 belongs, at least in part, (6) one or more interactions involving, at least in part, the received traffic 55 and/or the one or more services 206 and/or 207, and/or one or more of the offload engines 210A . . . 210N (see FIG. 2), and/or (7) one or more portions 232 of the contents 230 of the received traffic 55. This may permit the policies 25A . . . 25N, programming 184, and/or the one or more forwarding operations to be established and/or carried out, at least in part, on per user, expected usage, flow, tenant, source, destination, and/or traffic contents bases, and/or to be based at least in part upon one or more network service/offload engine-received traffic interactions. Advantageously, this may permit and/or facilitate truly individualized and/or particularized treatment and/or processing of the received traffic 55 by the forwarding mechanism circuitry 118 and/or processing mechanisms 130, based upon dynamic and/or static parameters, factors, and/or feedback, in accordance with the policies 25A . . . 25N and/or individual users/tenants service arrangements. This may give rise to, facilitate, and/or result in, at least in part, certain novel, non-obvious, and advantageous usage models.

For example, with particular reference being made to FIG. 2, in one such usage model, the one or more forwarding operations may result, at least in part, in the traffic 55 flowing to, through, and/or being processed, at least in part, by a subset of the processing mechanisms 130. In this usage model, the subset of the processing mechanisms 130 and/or the sequence order of this flow to, through, and/or processing by the subset of the processing mechanisms 130 may be predefined, at least in part, by and/or in accordance with the policies 25A . . . 25N.

For example, one or more switches 140 may initially receive, at least in part, traffic 55 (e.g., via one or more ports 164A), and one or more switches 140 may forward traffic 55, at least in part, to one or more controllers 120 and/or another entity (e.g., one or more applications 208 that may be, be comprised in, and/or may comprise, at least in part, one or more virtual machines). In response, at least in part, one or more controllers 120 and/or one or more applications 208 may determine, at least in part, based at least in part upon the above parameters/factors upon which policies 25A . . . 25N may have been established, which of the policies 25A . . . 25N (e.g., one or more policies 25A) may be applicable to and/or associated with, at least in part, traffic 55. Based upon and/or in accordance with, at least in part, such one or more policies 25A, one or more controllers 120 and/or one or more applications 208 may determine, at least in part, one or more initial processing mechanisms (e.g., one or more appliances/services 206) of the processing mechanisms 130 that is to process (at least initially) the traffic 55 and/or the one or more ports (e.g., one or more ports 160A) via which the traffic 55 is to be forwarded to one or more appliances/services 206. Also, in response at least in part, to receipt of traffic 55, one or more controllers 120 may issue, at least in part, programming 184 that may result, at least in part, in one or more switches 140 performing one or more forwarding operations that may forward, at least in part, the traffic 55 to one or more services 206. Alternatively or additionally, one or more applications 208 may directly forward, at least in part, traffic 55 to one or more appliances/services 206 for processing. Also alternatively or additionally, in response at least in part, to receipt of traffic 55, one or more controllers 120 and/or applications 208 may forward, at least in part, traffic 55 back to one or more switches 140. One or more appliances/services 206 may process, at least in part, the traffic 55. One or more appliances/services 206 then may forward the thus processed traffic 55 to circuitry 118 and/or to one or more applications 208.

One or more controllers 120 and/or one or more applications 208 then may determine, at least in part, based at least in part upon one or more policies 25A, whether additional and/or other processing is to be imparted to traffic 55. If no such additional and/or other processing is to be imparted, one or more controllers 120 and/or applications 208 may provide, at least in part, programming 184 to one or more switches 140 that may result, at least in part, in one or more switches 140 performing one or more forwarding operations that may forward the traffic 55 (e.g., via one or more ports 162A) to one or more destination entities 182.

Conversely, if one or more controllers 120 and/or one or more applications 208 determines, at least in part, that such additionally processing is to be imparted (e.g., by one or more appliances/services 207) to traffic 55, one or more controllers 120 may issue, at least in part, programming 184 to one or more switches 140 that may result, at least in part, in one or more switches 140 performing one or more forwarding operations that may forward, at least in part, the traffic 55 to one or more appliances/services 207. One or more appliances/services 207 may process, at least in part, the traffic 55. One or more appliances/services 207 then may forward the thus processed traffic 55 to circuitry 118 and/or to one or more applications 208. The previously described process involving determination of whether other and/or additional processing is to be imparted, the impartation of such other and/or additional processing, etc. may be repeated, as appropriate, for example, depending upon the particulars of the one or more policies 25A, until all of the processing that is to be imparted in accordance with the one or more policies 25A have been so imparted in a sequence order in accordance with the one or more policies 25A. After all such processing has been so imparted in this sequence order, the combined processing (e.g., that results from the traffic 55 having undergone all of this processing in this sequence order) one or more switches 140 may forward the thus processed traffic 55 to one or more destination entities 182.

Additionally or alternatively, processing may be imparted (e.g., initially and/or subsequently) to traffic 55 by one or more (e.g., one or more engines 210A) of the offload engines 210A . . . 210N that may be comprised in offload engines 134, instead of and/or in addition to processing imparted by appliances/services 206, 208. In this situation, one or more appliances/services 206, 208 may interact directly, at least in part, with the one or more offload engines 210A involved in such processing, in a manner that may by-pass, at least in part, the one or more switches 140 (e.g., to transfer traffic 55 to the one or more offload engines 210A from the one or more appliances/servers 206, 208, or vice versa). These one or more offload engines 210A may correspond to and/or be associated with, at least in part, the one or more appliances/services 206, 208 that are to be provided to and/or with respect to traffic 55 (e.g., in accordance with the one or more policies 25A).

Additionally or alternatively, in this usage model, after circuitry 118 initially receives traffic 55, circuitry 118 and/or one or more switches 140 may either (1) forward all of traffic 55 to one or more controllers 120 and/or one or more applications 208, or (2) forward only a portion of traffic 55 (e.g., one or more first packets in the flow to which traffic 55 belongs) to one or more controllers 120 and/or one or more applications 208. One or more controllers 120 and/or one or more applications 208 may determine, at least in part, based at least in part upon either all of the traffic 55 or only this portion of the traffic 55 (and/or the above parameters/factors), the one or more policies 25A that may apply to, at least in part, traffic 55, the one or more forwarding operations to be carried out by circuitry 118 in connection with traffic 55, the particular ones of the processing mechanisms 130 to which the traffic 55 is to be forwarded in the one or more forwarding operations, and/or the particular sequence order of the forwarding operations and/or processing to be imparted to the traffic 55. In this usage model, after the one or more controllers 120 and/or one or more applications 208 have made this determination, one or more controllers 120 may generate and/or provide, at least in part, to one or more switches 140 and/or circuitry 118 programming 184 that may configure and/or program, at least in part, one or more switches 140 with all of the forwarding operations to be carried out by circuitry 118 and/or one or more switches 140 in connection with traffic 55, the particular ones of the processing mechanisms 130 to which the traffic 55 is to be forwarded in these forwarding operations, and/or the particular sequence order of these forwarding operations and/or processing to be imparted to the traffic 55. Thereafter, circuitry 118 and/or one or more switches 140 may carry out these forwarding operations, etc. in accordance with this programming 184, for traffic 55 and/or any other ensuing traffic (e.g., traffic 290 received, at least in part, by circuitry 118 and/or one or more switches 140) that may correspond and/or be similar to, at least in part, traffic 55 in one or more salient and/or relevant aspects (e.g., in terms of corresponding, at least in part, to one or more of the above parameters/factors).

Additionally or alternatively, one or more controllers 120 (and/or one or more other privileged entities/applications) may reprogram, at least in part, the one or more switches 140 and/or may otherwise permit the one or more switches 140 to (1) determine, at least in part, whether traffic 55 may correspond to, adhere to, conform to, and/or match, at least in part, one or more policies 25A and/or (2) appropriately forward the traffic 55, based at least in part upon such one or more policies 25A, for appropriate processing. In this case, one or more switches 140 may use, at least in part, programming 184 to facilitate matching, at least in part, of the traffic 55 to one or more appropriate policies 25A.

Additionally or alternatively, the one or more policies 25A may be modified, at least in part, by and/or as a result, at least in part, of traffic 55 and/or 290 undergoing processing by and/or interaction with one or more processing mechanisms 130 and/or one or more controllers 120. For example, one or more controllers 120 and/or one or more (e.g., one or more appliances/network services 206) of the processing mechanisms 130 may modify, at least in part, the one or more policies 25A and/or may program, at least in part, one or more controllers 120 to appropriately process traffic 55 and/or 290 based at least in part upon the contents 230 of traffic 55 and/or the results of processing traffic 55 and/or 290 by one or more controllers 120 and/or one or more of the processing mechanisms 130. This may result, at least in part, in one or more controllers 120 issuing programming 184 to one or more switches 140 and/or circuitry 118 that may result, at least in part, in corresponding modification of the forwarding operations to be carried out by circuitry 118 and/or one or more switches 140 in connection with traffic 55 and/or 290, the particular ones of the processing mechanisms 130 to which the traffic 55 is to be forwarded in these forwarding operations, and/or the particular sequence order of these forwarding operations and/or processing to be imparted to the traffic 55 and/or 290.

Thus, in this embodiment, the programming 184, when executed, at least in part, by the circuitry 118 and/or one or more switches 140, may result, at least in part, in the received traffic 55 and/or 290 being processed by respective ones of the processing mechanisms 130 in accordance with the particular sequence order. Alternatively or additionally, in this embodiment, this particular sequence order may be such that the received traffic 55 and/or 290 is processed by respective ones 210A, 210N of the offload engines in a certain sequence order (e.g., one or more engines 210A may process the traffic before one or more engines 210N may process the traffic) that may be in-line with, at least in part, processing of the received traffic by one or more of the appliances/services 206, 207. In this embodiment, this certain sequence order may be determined (e.g., at least in part by one or more controllers 120 and/or one or more applications 208) based at least in part upon one or more policies 25A and/or one or more results of the respective processing of the traffic 55 and/or 290 by the appliances/services 206, 207 and/or offload engines 210A, 210N. These particular and/or certain sequence orders may be established, at least in part, so as to try to avoid and/or prevent resource contention. Additionally or alternatively, these particular and/or certain sequence orders may be established, at least in part, based at least in part upon interaction, at least in part, among or between appliances/services 206 and/or 207, one or more controllers 120, circuitry 118, and/or one or more engines 134.

For example, one or more controllers 120 and/or one or more applications 208 may establish for respective traffic flows 222A . . . 222N processing sequence orders 250A . . . 250N. These processing sequence orders 250A . . . 250N may be and/or comprise, at least in part, for respective traffic flows 222A . . . 222N received, at least in part, by circuitry 118 and/or one or more switches 140, the respective sequence orders of processing to be imparted by the processing mechanisms 130 to the respective received traffic flows 222A . . . 222N. For example, one or more sequence orders 250A may establish, at least in part, that one or more packets in traffic flow 222A are to be first processed by one or more appliances/services 206, and next, to be processed by one or more appliances/services 207, and next, to be processed by one or more engines 210A. However, one or more sequence orders 250N may establish, at least in part, that one or more packets in traffic flow 222N are to be first processed by one or more appliances 207, and next, to be processed by one or more engines 210A, and next, to be processed by one or more appliances 206, and next, to be processed by one or more engines 210N. These sequence orders 250A, 250N, as well as, the particular ones of the offload engines 134 and/or appliances/services comprised in the orders 250A, 250N, may be established, at least in part, in such a manner as to prevent resource contention with respect to each other and/or any other sequence orders comprised in sequence orders 250A . . . 250N. For example, as can be seen from the above sequence orders 250A, 250N, the flows 222A, 222N are never being contemporarily processed by the same processing mechanism. Additionally, the particular offload engines and/or appliances/services in the sequence orders 250A, 250N are selected so as to avoid contemporaneous use of the same ports, network communication links, bus communication resources, switch resources, etc. Additionally or alternatively, these sequence orders 250A . . . 250N may be determined based at least in part upon the results other processing (e.g., of the same and/or other flows by the processing mechanisms 130) and/or of one or more subsets of the policies 25A . . . 25N that may be associated therewith. For example, depending upon the results of such processing and/or of such policy subsets, additional and/or other processing may be determined to be imparted to these flows. The sequence orders 250A . . . 250N may be modified, at least in part, to take this into account, to avoid resource contention, and/or to otherwise improve processing efficiency. Further additionally or alternatively, one or more of the policies 25A . . . 25N may establish, at least in part, that such processing and/or the sequence orders 250A . . . 250N may take into account and/or be based at least in part upon current operational statuses (e.g., workload, workload balancing, quality of service, proper functioning status, operational capacity, etc.) of the circuitry 118, one or more switches 140, processing mechanisms 130, etc. Circuitry 118, one or more switches 140, processing mechanisms 130, offload engines 134, appliances/services 206, 207, etc., may provide, at least in part, current status information indicating, at least in part, such current operation statuses to one or more controllers 120 and/or one or more applications 208, in order to facilitate this.

In this embodiment, packets may be said to belong to a flow or traffic flow if the packets exhibit, at least in part, one or more commonalities, such as, for example, one or more common sources, destinations, ports, virtual local area network identifiers, and/or other commonalities. Also in this embodiment, information related to the one or more sources and/or destinations of the traffic 55 and/or 290 may be identified, at least in part, based, at least in part, upon one or more logical, physical, virtual, and/or protocol addresses (e.g., medium access control, network, internetwork, port, application, virtual machine, tenant, project, flow, etc. addresses, numbers, and/or identifiers) that may be comprised, at least in part, in header information comprised, at least in part, in contents 230 and/or portion 232. Of course, many modifications, variations, and/or alternatives are possible, and such (and/or other) information may be accounted for, tracked, and/or located elsewhere, without departing from this embodiment.

For example, as part of the one or more forwarding operations following an initial receipt of traffic 55 and/or 290 by circuitry 118 and/or one or more switches 140, circuitry 118 and/or processing mechanisms 130 may provide, at least in part, in association, at least in part, with traffic 55 and/or 290, one or more indications 170A . . . 170N. One or more indications 170A . . . 170N may indicate, at least in part, one or more processing operations associated with the processing mechanisms 130 that are to be used, at least in part, in one or more subsequent forwarding operations (e.g., carried out by the circuitry 118 and/or one or more switches 140).

For example, one or more indications 170A . . . 170N may indicate, at least in part, (1) one or more processing operations that are to be performed upon the traffic 55 and/or 290, (2) one or more processing operations that have been performed upon the traffic 55 and/or 290, (3) the sequence order (e.g., 250A) in which these processing operations are to be performed, (4) the particular processing mechanisms that are to perform these processing operations, (5) the ingress/egress ports, network nodes, entities, communication links, etc. that the traffic 55 and/or 290 is to transit in order to facilitate and implement, at least in part, the associated forwarding and/or processing operations. In this embodiment, one or more indications 170A . . . 170N may be implicit (e.g., not expressly recited in association with traffic 55 and/or 290), at least in part, and/or explicit (e.g., expressly recited in association with traffic 55 and/or 290), at least in part.

By way of example, in carrying out the particular sequence order 250A, different ingress and/or egress ports of the one or more switches 140 and/or processing mechanisms 130 may be used for respective forwarding operations and/or respective transmissions to the one or more switches 140. One or more indications 170A . . . 170N may indicate and/or track, at least in part, the ingress and/or egress ports (e.g., for respective packets in traffic 55 and/or 290) that are to be employed in carrying out sequence order 250A, in one or more forwarding/tracking tables 295 that may be comprised, at least in part, in one or more virtual switches 202 and/or one or more physical switches 204. As respective forwarding and/or processing operations are completed with respect to respective packets in traffic 55 and/or 290, this may be indicated in the one or more tables 295. Additionally or alternatively, one or more indications 170A . . . 170N may be explicitly appended, at least in part, and/or prepended, at least in part, to respective packets in the traffic 55 and/or 290 to permit the one or more switches 140 and/or circuitry 118 to (1) identify these respective packets from other packets and/or other portions of traffic 55 and/or 290 that may have the same or similar header (and/or other) information, (2) determine one or more next/subsequent hops, destinations, processing operations, and/or processing mechanisms to which these respective packets are to be sent, (3) determine one or more previous processing operations in the sequence 250A that these respective packets have already undergone, and/or (4) one or more respective ports via which these respective packets are to be transmitted to reach these one or more next hops, destinations, and/or processing mechanisms. Analogous (and/or other) techniques may be employed, in accordance with the foregoing, to indicate and/or track, for example, network nodes, entities, communication links, etc. that the traffic 55 and/or 290 is to transit in order to facilitate and implement, at least in part, the forwarding and/or processing operations associated with sequence order 250A. Advantageously, as a result, at least in part, of employing such techniques in this embodiment, one or more switches 140 and/or circuitry 118 may receive, at least in part, at multiple respective times, via the same (and/or different) respective ports, respective packets in traffic 55 and/or 290 that may have the same or similar header (and/or other) information, but may forward the respective packets to different destinations (e.g., different ones of the processing mechanisms 130, different processing operations, etc.), depending at least in part upon the one or more indications 170A . . . 170N, in such a way as to result in performance of the complete processing that is to be imparted in accordance with sequence order 250A.

Thus, in this embodiment, multiple forwarding operations may be employed that may result in the received traffic 55 and/or 290 being forwarded via multiple ports (e.g., 160A, 160B, 160N) of the one or more switches 140 and/or circuitry 118 to multiple (e.g., appliance/service 206, appliance/service 207, and/or offload engine 210A) of the processing mechanisms 130. In this embodiment, as stated previously, appliance/service 206 and appliance/service 207 may be at multiple, different respective network processing layers (e.g., X and Y, respectively).

Alternatively or additionally, other usage models are also contemplated in this embodiment. For example, one or more controllers 120 may program one or more switches 140 to forward to send one or more predetermined types and/or flows of traffic to one or more appliances/services 206. However, it may be appropriate (e.g., in order to carry out security related preprocessing) for one or more appliances/services 206 to utilize hardware resources (e.g., one or more offload engines 210A) in-line with the forwarding of the traffic to one or more appliances/services 206. In this situation, the programming of one or more switches 140 may result, at least in part, in one or more switches 140 forwarding the traffic to one or more offload engines 210A for processing. After processing the traffic, one or more engines 210A may forward the traffic back to one or more switches 140. One or more switches 140 then may forward the traffic to one or more appliances/services 206. Advantageously, such in-line hardware processing may reduce software overhead and/or latencies, and/or make such latencies more predictable.

In this embodiment, such in-line processing may result, at least in part, in forwarding, at least in part, traffic 55 directly (or essentially directly) to one or more of the offload engines 210A . . . 210N for processing. For example, in this embodiment, after being initially received, traffic 55 may be forwarded by one or more switches 140 (e.g., in accordance with one or more policies 25) directly (or essentially directly) to one or more of the offload engines 210A . . . 210N for processing, and thereafter, may be forwarded for further processing to one or more applications/virtual machines 208 only if such further processing is provided for (e.g., required) by one or more policies 25. However, in this case, prior thereto, one or more applications/virtual machines 208 may have appropriately modified, at least in part, one or more policies 25 to ensure that such further processing only occurs if it is truly appropriate. Such modification may have occurred, for example, as a result, at least in part, of interaction of the one or more applications/virtual machines 208 with one or more controllers 120 and/or (in one or more appropriate special cases) with the one or more switches 140 (e.g., directly). Advantageously, this may avoid, at least in part, unnecessary and/or undesirable processing overhead and/or thrash that may result from, for example, forwarding such traffic 55 for processing by hardware, and thereafter forwarding such traffic 55 for processing to one or more virtual machines, and subsequently forwarding such traffic 55 back to hardware for further processing.

Of course, many modifications are possible without departing from this embodiment. For example, in-line hardware processing may involve processing by multiple offload engines. For example, the programming of one or more switches 140 may result, at least in part, in one or more switches 140 forwarding the traffic to one or more offload engines 210A for security and/or other related processing. After processing the traffic, one or more engines 210A may forward the traffic back to one or more switches 140. One or more switches 140 then may forward the traffic to one or more engines 210N (e.g., for regular expression and/or other processing). After processing the traffic, one or more engines 210N may forward the traffic back to one or more switches 140. One or more switches 140 then may forward the traffic to one or more appliances/services 206.

Figure 3:
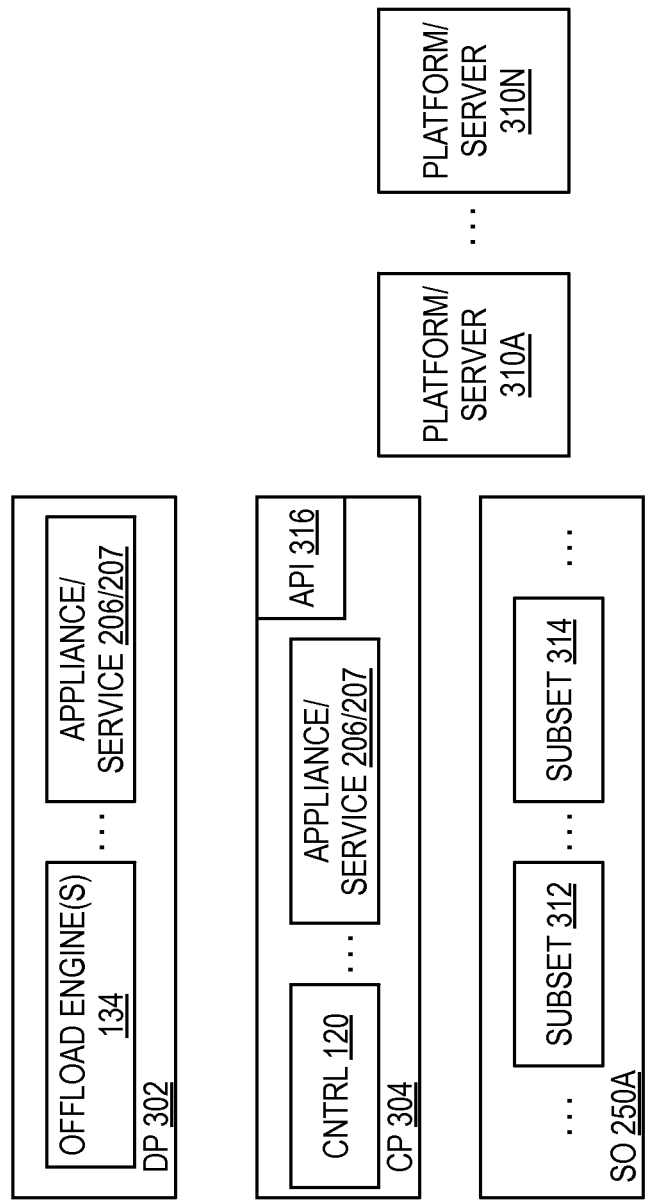
FIG. 3 illustrates features in an embodiment.

Additionally or alternatively, in order to improve processing and/or transmission efficiency and/or latency, and/or control jitter in SDN 101, sequence order 250A may be established, at least in part, in such as a way as to position adjacent to each other in the sequence order (e.g., to the extent reasonably practicable) 250A respective processing mechanisms/processing operations that are co-located or nearby (e.g., from a meaningful latency and/or efficiency standpoint) to each other (e.g., in the same server/platform or in nearby servers/platforms in the SDN 101), at least in part. For example, with reference being made to FIG. 3, SDN 101 may comprise, for example, data plane 302 and control plane 304 that may be implemented and/or embodied in and/or by, at least in part, a plurality of platforms and/or servers 310A . . . 310N. In this embodiment, the offload engines 134 may be comprised in, at least in part, data plane 302. Appliances/services 206, 207 may be comprised, at least in part, in control plane 304. Control plane 304 may also comprise, at least in part, one or more controllers 120 and/or API 316. In this example, in sequence order 250A, one or more subsets 312 of the engines 134 (e.g., comprising one or more engines 210A) may be adjacent to (e.g., in this case, immediately preceding) one or more subsets 314 of the appliances/services 206, 207 (e.g., comprising one or more appliances/services 206). One or more subsets 312 of the engines 134 may be co-located, at least in part, for example, at one or more common platforms/servers 310A.

Additionally or alternatively, in this embodiment, the topologies of the one or more applications/virtual machines, offload engines, etc. may be advantageously taken into account. For example, for certain processing flows and/or sequences, the processing sequence order and/or the locations of the entities that are to be perform the processing (e.g., the nodes, servers, etc. that comprise and/or embody these entities) may depend, at least in part, upon relative locations of these entities (e.g., of the virtual machines that may comprise the applications, etc.), the utilization levels of such entities, etc.

Additionally or alternatively, offload engines 134 may expose, at least in part, their respective capabilities to one or more of the appliances/services 206, 207 (e.g., one or more appliances/services 206) and/or one or more controllers 120. These one or more appliances/services 206 may use, at least in part, one or more API 316 to select, at least in part, which among the offload engines 134 and/or the appliances/services 206, 207 may be used, in accordance with, at least in part, one or more policies 25A, to process, at least in part, the traffic 55 and/or 290. For example, one or more appliances/services 206 may select subset 312 of the engines 134 and/or subset 314 of the appliances/services 206, 207 to process traffic 55 and/or 290, and may program, at least in part, one or more controllers 120 and/or control plane 304, using API 316, to program one or more switches 140 to forward the traffic 55 and/or 290 to these subsets 312, 314 in accordance with the sequence order 250A. The selection of subsets 312, 314 by one or more appliances/services 206 may be based, at least in part, upon one or more policies 25A, and/or the respective capabilities of the subsets 312, 314 and/or of the one or more platforms/servers that may comprise the respective subsets 312, 314 (e.g., including whether offload capabilities may be available on these one or more platforms/servers).

The programming that may be provided, at least in part, via API 316, may comprise, at least in part, exchange of information that may result in, at least in part, for example, selection of filters that may be used to determine, at least in part, which types/flows of traffic may be forwarded to which types of services, appliances, and/or offload engines. Such information may comprise, for example, whether and/or types of offload engine hardware and/or capabilities may be available (e.g., based at least in part upon previous registration of such offload engines with one or more switches 140, one or more controllers 120, and/or circuitry 118).

In this embodiment, various types of offload capabilities may be exposed that may facilitate certain type of processing options. For example, these options may facilitate, at least in part, stateless packet processing (e.g., identifying and/or classifying respective first (and/or other packets in respective flows), packet transformation (e.g., packet header/field insertion/removal, encryption/decryption), return of transformed packets and/or other (e.g., out-of-band data/status information) to appliances/services 206, 207, one or more controllers 120, etc.

In this embodiment, one or more controllers 120 may be capable of preventing conflict among policies 25A . . . 25N. One or more controllers 120 may accomplish this by ensuring that no policy is created or modified in such a way as to conflict with another policy in the policies 25A . . . 25N (e.g., that may, without departing from this embodiment, reside, at least in part, in one or more switches 140). Additionally, as stated previously, circuitry 118, one or more switches 140 and/or one or more controllers 120 may exhibit (in whole or in part) the features, construction, and/or operations of the policy engine circuitry described in co-pending U.S. patent application Ser. No. 13/675,324, filed Nov. 13, 2012, entitled "Policy Enforcement In Computing Environment." For example, in accordance with the aforesaid co-pending U.S. patent application, one or more switches 140 and/or circuitry 118 may comprise multiple (not shown) physical switches, virtual switches (e.g., vSwitches), API, and/or protected memory spaces distributed, replicated, and/or comprised, at least in part, in multiple of the platforms 310A . . . 310N. More specifically, these not shown physical switches, API, and/or protected memory spaces may be distributed, replicated, and/or comprised, at least in part, in respective not shown chipsets, host processors, and/or network interface controllers in the respective platforms/servers 310A ... 310N. These features may permit, at least in part, one or more controllers 120 to be able to globally monitor, control and/or manage, at least in part, the respective configurations and/or operations of, and/or data stored in these distributed components, in accordance with the policies 25A ... 25N, in order to permit the circuitry 118 to operate in the manner described previously.

Advantageously, this embodiment may be capable both of (1) individualizing the processing that may be imparted to received traffic on a per-user, per-policy basis, etc., and (2) coordinating the specific manner in which the policies, processing, and resource configuration/localization are implemented so as to meaningfully facilitate and/or improve processing efficiency. Advantageously, this may permit this embodiment to be capable of reducing or eliminating port, switch, and/or resource overuse, underuse, and/or thrashing in this embodiment. Also advantageously, this may prevent traffic from unwanted bouncing between or among the one or more switches and/or other resources, and/or may reduce the number of hops involved in traffic processing, in this embodiment.

Further advantageously, in this embodiment, the processing sequence orders, policies, and/or other processing-related decisions may be made and/or modified based at least in part upon real time or near real time status and/or capability information from the processing mechanisms, etc. Advantageously, this may permit this embodiment to be able to provide real time or near real time fine granularity for quality of service adjustments to be made to, and/or statistically accurate visibility of workloads and/or resource utilizations, as the workloads and/or utilizations change in this embodiment.

Further advantageously, in this embodiment, the processing sequence orders, policies, and/or other processing-related decisions may be made and/or modified based at least in part upon particular contents of the received traffic. Advantageously, this may permit this embodiment to offer improved processing/policy flexibility and dynamic processing capabilities.

Further Possibilities

Figure 4:
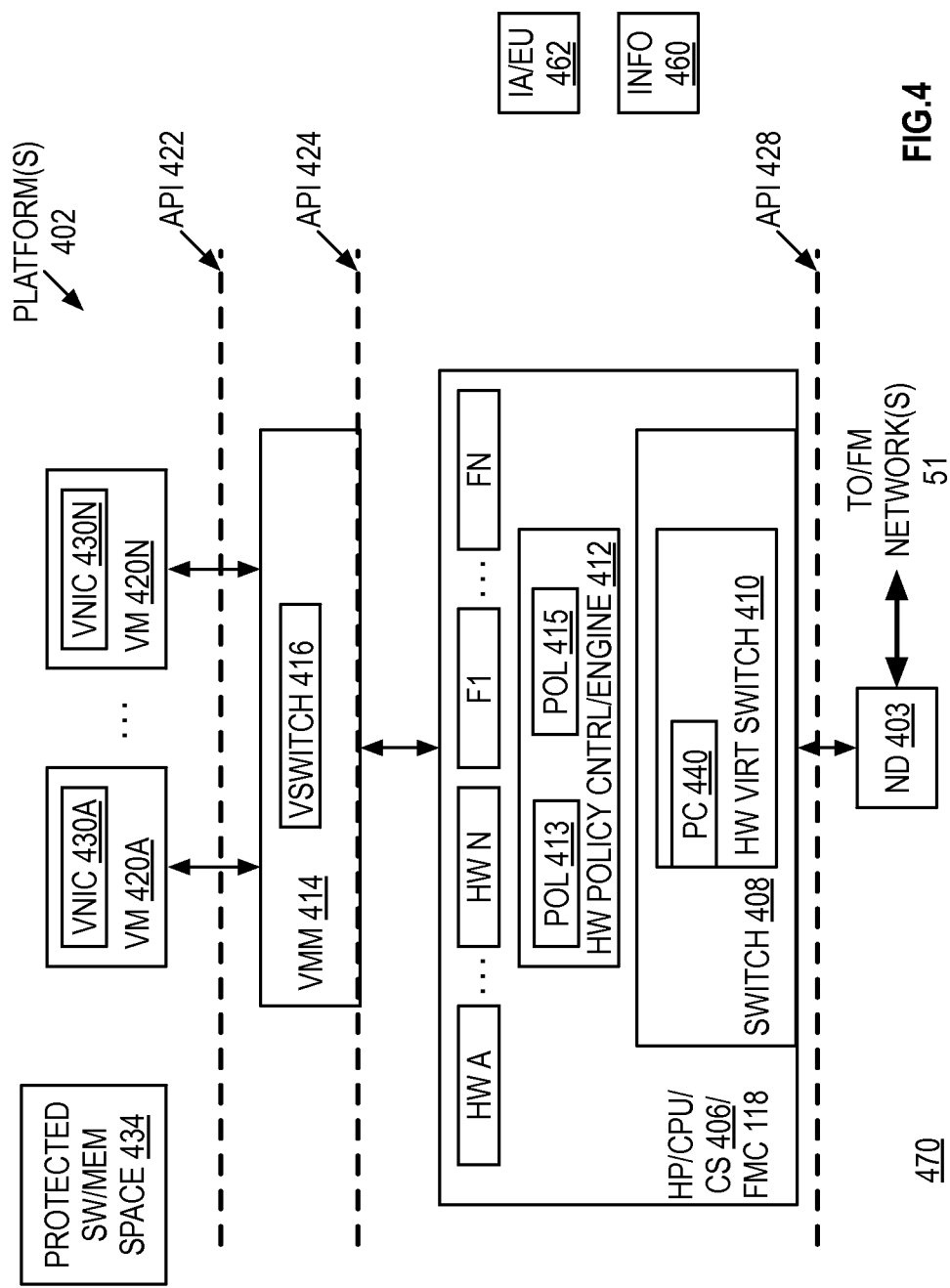
FIG. 4 illustrates features in an embodiment.

Further possibilities are contemplated in accordance with this embodiment. For example, as shown in FIG. 4, without departing from this embodiment, in operation of this embodiment, one or more multi-tenant/multi-tenant-enabled/multi-application network environments 470 may be provided, at least in part. One or more environments 470 may comprise, at least in part, one or more platforms 402 that may be communicatively coupled together (and/or to other components/devices, etc.) via one or more networks (e.g., one or more networks 51 shown in FIG. 1). In this embodiment, a multi-tenant and/or multi-application environment may be or comprise, at least in part, one or more entities (1) that, in operation, may permit a plurality of tenants to utilize (e.g., as tenants and/or contractors for services, functions, capabilities, etc. of one or more hardware and/or software services of one or more platforms and/or one or more software defined network systems, and/or one or more locally, centrally, and/or remotely controlled storage (e.g., software defined storage), and/or other arrangements) the one or more entities in accordance with one or more policies, and/or (2) may be associated, at least in part, with workloads that share and/or contend for, at least in part, one or more resources, software processes/services, hardware entities/services, instrumentalities, and/or portions of one or more platforms.

In operation, one or more platforms 402 may comprise, for example, at least in part, one or more VM 420A ... 420N, one or more vSwitch processes 416, one or more VMM 414 (e.g., one or more nested and/or root hypervisors), one or more host processors/central processing units/chipsets (collectively or singly referred to hereinafter by numeral 406), and/or circuitry 118, and/or one or more network devices 403. VM 420A ... 420N may comprise one or more respective (e.g., virtual) network interface controllers 430A ... 430N via which the VM 420A ... 420N may logically/virtually access one or more networks 51. More specifically, however, VM 420A ... 420N and/or virtual NIC 430A ... 430N may access, at least in part, one or more vSwitch processes 416 and/or VMM 414 via one or more API 422. Additionally or alternatively, one or more API 422 may expose, at least in part, switching and/or services to one or more VM 420A ... 420N.

Figure 5:
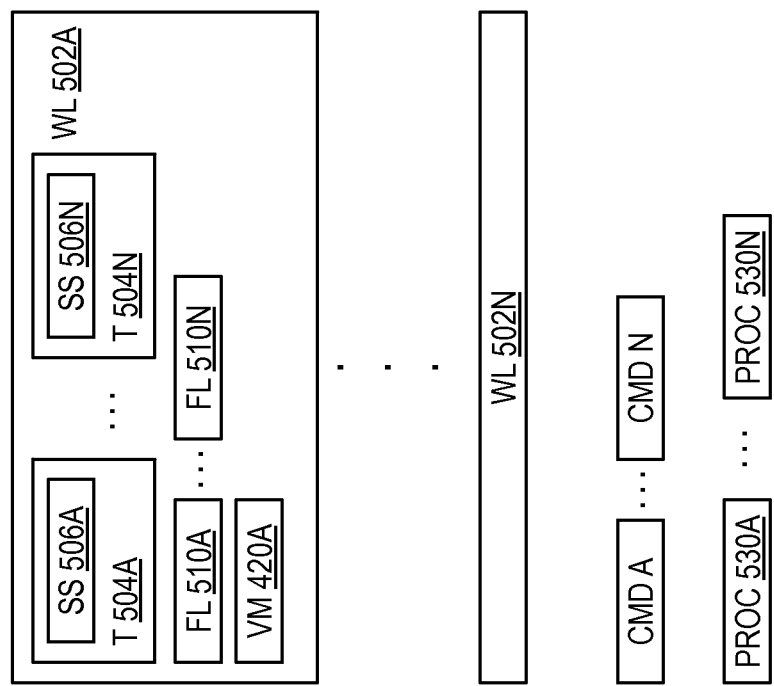
FIG. 5 illustrates features in an embodiment.

Also, in operation, one or more host processors/central processing units/chipsets 406 and/or circuitry 118 may comprise, expose, and/or present for use (e.g., via one or more API 424 of one or more vSwitch processes 416 and/or VMM 414), at least in part, one or more virtual and/or physical functions F1 ... FN. Additionally or alternatively, one or more other techniques may be employed to present such resources. One or more functions F1 ... FN may be, comprise, implement, and/or facilitate use/access of, at least in part, one or more combinations of one or more hardware processing features/modules HW A ... HW N and/or software processes 530A ... 530N (see FIG. 5). Processes 530A ... 530N may be executed and/or resident in, at least in part, one or more protected software/memory spaces 434 (e.g., protected, at least in part, from access and/or tampering by one or more VMM 414, vSwitch 416, one or more VM 420A ... N, and/or one or more virtual NIC 430A ... 430N) comprised, at least in part, in one or more platforms 434. Such modules HW A ... HW N may comprise and/or correspond to, at least in part, for example, one or more of the offload engines 134 and/or other hardware processing circuitry. Processes 530A ... 530N may be or comprise, at least in part, for example, one or more storage control, power control, network control, security control, and/or compute control processes. Additionally or alternatively, one or more of the processes 530A ... 530N may be or comprise, at least in part, one or more VMM and/or vSwitch processes. Additionally, one or more host processors/central processing units/chipsets 406, circuitry 118, one or more network devices (e.g., one or more NIC), software programs, and/or firmware programs may comprise, at least in part, one or more (e.g., hardware) policy controllers/engines 412 and/or one or more switches 408. One or more switches 408 may comprise, at least in part, one or more hardware virtual switches 410 and/or port circuitry 440. Additionally or alternatively, one or more switches 408 may comprise, at least in part, hardware networking and/or switching circuitry, and or other circuitry, for processing network, storage, and/or security workload in conjunction with vSwitch 416, one or more policies 413 and/or 415, and/or engine 412. One or more switches 408 and/or 410 may be or comprise, for example, at least in part, one or more switches 140 (see FIGS. 1 and 2). Port circuitry 440 may be or comprise, at least in part, for example, one or more ports 164A ... 164N and/or 162A ... 162N (see FIGS. 1 and 2) and/or related circuitry.

Additionally or alternatively, without departing from this embodiment, protected space 434 may be used, at least in part, to run security processing and/or any other processing that may be (1) hidden, at least in part, from one or more VMM 414, (2) run before one or more VMM 414 may be run (e.g., to provide greater security and/or integrity), (3) run to provide processing (e.g., in conjunction with one or more hardware modules HW A . . . N and/or switch 408) to related to traffic, policy, and/or communication processing related to one or more remote entities (e.g., a software defined networking controller), and/or (4) comprise and/or be related to one or more processes may be desired not to run under control of the one or more VMM 414. One or more resources that may be allocated to space 434 may be user configurable, at least in part. Additionally or alternatively, control and/or access by the VMM 414, and/or sequestration from such control and/or access, of one or more portions of the one or more resources allocated to the space 434 may be user-configurable, at least in part. Additionally or alternatively, one or more of the processes 530A . . . 530N may not reside and/or be executed in, at least in part, one or more spaces 434; in this arrangement, such one or more of processes 530A . . . 530N may reside and/or be executed in, at least in part, one or more (at least semi-protected) VM and/or VMM service-related spaces.

One or more platforms 402 also may comprise one or more network devices 403 that may be accessible, at least in part, via one or more API 428 (e.g., one or more open standard API that may permit and/or expose network connectivity, via one or more network devices 403, to one or more switches 408, 410 (and/or to other components of one or more platforms 402). One or more network devices 403 may be or comprise, for example, stateless (and/or other) medium access control, fabric, and/or other network/connectivity circuitry that may permit, at least in part, communicative coupling and/or access of one or more platforms 402 to one or more networks 51. Without departing from this embodiment, switch 408 may comprise one or more network devices 403, thereby obviating use of one or more (e.g., external) network devices 403.

In operation, one or more workloads and/or one or more associated policies may be provided to the one or more platforms 402 contemporaneously and/or in response to, at least in part, allocation of the one or more workloads to the one or more platforms 402. For example, one or more VMM 414 and/or vSwitch 416 (and/or one or more other software processes and/or centralized entities, e.g. one or more SDN controllers) may allocate, at least in part, one or more workloads 502A . . . 502N (see FIG. 5) to one or more platforms 402 (and/or one or more components thereof). In response to and/or in coordination with, at least in part, this allocation, at least in part, one or more workloads (e.g., 502A) to one or more platforms 402, one or more host processors/central processing units/chipsets 406 and/or circuitry 118 may provide, at least in part, to one or more platforms 402, one or more policies 413 associated, at least in part, the one or more allocated workloads 502A. Additionally or alternatively, without departing from this embodiment, such allocation of one or more workloads 502A may be performed, at least in part, by one or more (e.g., central/remote) entities that may be involved in controlling multiple platforms 402, such as, for example, one or more SDN controllers, cloud operating systems, open software stack agents, local agents (e.g., VMM 414 and/or vSwitch 416), and/or multiple controlling schedulers (e.g., resource allocators, orchestrators, etc.). Responsibilities of such entities may be divided, for example, such that one or more such entities may be responsible for compute allocation, one or more such entities may be responsible for network allocation, one or more such entities may be responsible for storage allocation, etc. These one or more policies 413 may have been previously provided, at least in part, to the one or more host processors/central processing units/chipsets 406 and/or circuitry 118 by one or more VMM 414 and/or vSwitch 416 (and/or one or more other software processes). Also in response, at least in part, to the allocation, at least in part, of the one or more workloads 502A to one or more platforms 402, one or more host processors/central processing units/chipsets 406 and/or circuitry 118 may initiate, at least in part, the execution of the one or more workloads 502A by the one or more platforms 402 and/or may coordinate implementation of the policy with one or more switches 408 and/or one or more associated policy engines 412 (and/or other local or remote policy engine).

For example, in this embodiment, one or more policies 413 may be, correspond to, and/or comprise, at least in part, one or more of the polices 25 and/or 25A . . . 25N (see FIGS. 1 and 2). Additionally or alternatively, without departing from this embodiment, the one or more policies 413 may be, correspond to, and/or comprise, at least in part, one or more user provided and/or infrastructure owner provided policies (e.g., adapted, as appropriate, FOR use in connection with infrastructure). The one or more workloads 502A may be or comprise, at least in part, one or more of the VM 420A . . . 420N (e.g., one or more VM 420A), one or more network traffic flows (e.g., 510A), one or more portions of (e.g., VM, application, and/or project-associated) network traffic (e.g., 504A), one or more subsets (e.g., 506A) thereof, and/or one or more resources that may be used/consumed in processing and/or by such entities. Additionally or alternatively, one or more workloads 502A may be or comprise, at least in part, one or more groups of such entities, such as, for example, one or more groups of traffic flows 510A . . . 510N. In this embodiment, one or more workloads 502A may be for the purpose of, implement, and/or facilitate implementation of, at least in part, compute processing, network processing, security processing, storage processing, energy-consumption-related processing, and/or other and/or additional types of processing (e.g., in accordance with the policies 413 and/or for the benefit of one or more tenants in the multi-tenant environment). In this embodiment, the one or more policies 413 may be based upon, at least in part, implementation (and/or other) information 460 that may be supplied, at least in part, by one or more infrastructure administrators/end (and/or other) users 462 of the multi-tenant environment 470. Obtaining, generating, and/or adapting (e.g., for platform and/or infrastructure and/or purposes) policies 413 and/or 415 may be carried out, at least in part, by various of the foregoing entities and/or components of environment 470, including without limitation, circuitry 118, and/or one or more host processors/CPU/CS 406.

Additionally or alternatively, without departing from this embodiment, one or more VMM 414 and/or vSwitch 416 (and/or one or more other software processes 530A . . . 530N) may determine that processing of one or more traffic subsets is to be carried out one or more hardware modules and may provide one or more pertinent policies for such processing to such one or more hardware modules. For example, one or more VMM 414 and/or vSwitch 416 (and/or one or more other software processes 530A . . . 530N) may provide traffic processing control related to, at least in part, processing of one or more workloads 502A . . . 502N. Such traffic control may be provided, at least in part, to one or more host processors/central processing units/chipsets 406 and/or circuitry 118. Such traffic control may be based, at least in part, upon one or more determinations made, at least in part, by one or more VMM 414 and/or vSwitch 416 (and/or one or more other software processes 530A . . . 530N). Additionally or alternatively, such one or more determinations may be made, at least in part, by switch 408 (e.g., under the control of VMM 414, vSwitch 416, and/or one or more SDN controllers). In response, at least in part, to such traffic control, one or more host processors/central processing units/chipsets 406 and/or circuitry 118 may issue one or more commands CMD A ... N to one or more host processors/central processing units/chipsets 406, circuitry 118, and/or one or more platforms 402 that may result, at least in part, in one or more traffic subsets 506A ... 506N being processed, at least in part, by one or more hardware modules HW A ... N, software processes 530A ... 530N, and/or VM 420A ... 420N in accordance with one or more portions 415 of one or more other policies that may be associated, at least in part, with the one or more traffic subsets 506A ... 506N. These one or more portions 415 of one or more other policies may correspond to and/or comprise, at least in part, one or more of the policies 25 and/or 25A ... 25N, and/or may be provided to such hardware HW A ... N by one or more VMM 414 and/or vSwitch 416 (and/or one or more other software processes 530A ... 530N). These one or more portions 415 of one or more other policies may be specifically selected and/or chosen by one or more VMM 414 and/or vSwitch 416 (and/or one or more other software processes 530A ... 530N) so as to be specifically tailored to result in the appropriately processing of one or more traffic subsets 506A ... 506N given the specific nature and/or characteristics of such one or more traffic subsets 506A ... 506N, current processing workloads, distribution, and/or environment, etc. The one or more selected hardware modules HW A ... HW N may carry out the processing of these subsets 506A ... 506N in accordance with the one or more portions 415 of the one or more other policies.

For example, in this embodiment, the one or more commands CMD A ... N may result, at least in part, in one or more allocation changes related, at least in part, to one or more hardware, software, device, VM, compute entity, platform, storage, and/or network migrations. For example, in this embodiment, these one or more allocation changes may be or comprise, at least in part, one or more hardware allocation changes, one or more software allocation changes, and/or one or more virtual machine allocations. These allocation changes may be related to and/or comprise, for example, which combinations of the hardware modules HW A ... N and/or software processes 530A ... 530N may be assigned to correspond to the functions F1 ... FN, and/or which traffic subsets 506A ... 506N may be assigned to be processed by which of these functions F1 ... FN, and/or by which of the VM 420A ... N, etc. For example, the one or more hardware allocation changes may be related to and/or comprise, for example, which of the hardware modules HW A ... N may be allocated to process, at least in part, the one or more traffic subsets 506A ... 506N. The one or more software allocation changes may be related to and/or comprise, for example, which of the software processes 530A ... 530N may be allocated to process, at least in part, the one or more traffic subsets 506A ... 506N. The one or more VM allocation changes may be related to and/or comprise, for example, which of the software processes 530A ... 530N may be allocated to process, at least in part, the one or more traffic subsets 506A ... 506N.

As stated above, these allocation changes may be related to and/or permit, at least in part, one or more hardware, software, storage, compute entity, device, VM, platform, and/or network migrations. For example, as a result, at least in part, of the execution of one or more commands CMD A ... CMD N by one or more host processors/central processing units/chipsets 406, circuitry 118, and/or one or more platforms 402, the processing of the one or more traffic subsets 506A ... 506N may be migrated, at least in part, from one or more of the hardware modules, software processes, and/or VM that previously processed them to one or more other and/or additional of these hardware modules, software processes, and/or VM. Such migration may result, at least in part, from the providing of appropriate information to a scheduler or other entity. Such migration may be used in conjunction with and/or to facilitate, at least in part, seamless and/or graceful physical and/or logical migration of hardware components and/or software processes between or among individual platforms and/or components/devices thereof that may be comprised in one or more platforms 402, and/or between or among one or more networks comprised in one or more networks 51.

Additionally or alternatively, engine 412, switch 408, vSwitch 416, and/or VMM 414 (and/or a subset of such components) may determine, at least in part, that current resources at a given platform may be inadequate for placement of additional workload at that given platform. In such case, engine 412, switch 408, vSwitch 416, and/or VMM 414 (and/or a subset of such components) may prevent, at least in part, such placement before it takes place and/or is initiated, at least in part. Also in such case, engine 412, switch 408, vSwitch 416, and/or VMM 414 (and/or a subset of such components) may command and/or initiate, at least in part, moving, at least in part, of one or more other workloads of the given platform (e.g., to one or more other platforms) to allow for accommodation of new workload and associated policies, to allow better grouping and/or consolidation of affiliated/associated workloads for organizational reasons (e.g., such affiliated/associated workloads may belong to same/similar project and/or to permit processing/execution/proximity for data/command dependency, etc. reasons), etc.

Further additionally or alternatively, such workload placement may be carried out in a certain sequence depending upon the types of workloads being placed. For example, workloads involving virtual machines may be placed first, followed by workloads involving network, storage, and/or security, etc. During placement of such workloads, engine 412, switch 408, vSwitch 416, and/or VMM 414 (and/or a subset of such components) may make determinations (discussed above) concerning inadequacy of resources, etc., and may command and/or initiate movement of workloads accordingly, in the manner set forth above, so as to improve placement of combined and/or interrelated workloads. For example, such placement and/or movement may occur such that common types of workloads may be co-located (e.g., virtually and/or physically) on appropriate nodes/platforms (e.g., compute-related workloads on compute-related nodes/platforms, etc.). Additionally or alternatively, one or more platforms (and/or policy engines) may provide workload utilization information to one or more schedulers (not shown) that may permit the one or more schedulers to select, at least in part, one or more preferred placement locations, geographic/topological information, and/or network utilization information that may be used, at least in part, to select such movement and/or placement locations.

Additionally or alternatively, without departing from this embodiment, one or more hardware modules (e.g., HW A) may process, at least in part, in accordance with one or more policies 413, one or more portions of traffic 504A ... 504N and/or flows 510A ... 510N directly as these one or more portions are received by one or more switches 410 and/or 408 at port circuitry 440 (e.g., directly from one or more networks 51 or directly from one or more of the VM 402A ... 402N). Additionally or alternatively, before and/or after such processing by these one or more of the hardware modules HW A, processing may be provided, at least in part, by one or more other hardware modules and/or one or more of the software processes 530A ... 530N. Such processing by one or more modules HW A, one or more other hardware modules, and/or one or more of the software processes 530A ... 530N may be invoked via, for example, one or more of the functions F1 . . . FN and/or one or more interactions with one or more of the VM 420A . . . 420N.

By way of example, one or more commands (e.g., CMD A) issued by one or more VMM 414 and/or vSwitch 416 (and/or one or more other software processes 530A . . . 530N, one or more (e.g., centralized) entities, such as, one or more SDN controllers, cloud operating system, and/or components thereof) may result, at least in part, in one or more hardware modules HW A receiving one or more traffic subsets (e.g., one or more subsets 506A) directly from port circuitry 440. In this case of this example, port circuitry 440 may be or comprise one or more dedicated ports of the hardware module HW A and/or switch 410 that may be assigned to and/or associated with the one or more VM 420A (e.g., by the VMM 414, vSwitch 416, and/or other software) that are ultimately intended to receive the one or more subsets 506A after they have been processed. Alternatively or additionally, these one or more commands CMD A also may result, at least in part, in one or more modules HW A providing hardware processing, at least in part, to the one or more traffic subsets 506A in accordance, at least in part, to the one or more policies 413. Alternatively or additionally, these one or more commands CMD A also may result, at least in part, in, after such hardware processing, one or more traffic subsets 506A undergoing software processing, at least in part, by one or more software processes (e.g., 530A), and thereafter, the thus-processed one or more subsets 506A being provided, at least in part, to one or more VM (e.g., 420A). Alternatively or additionally, these one or more commands CMD A also may result, at least in part, in, after the hardware processing by one or more modules HW A, the one or more subsets 506A being provided directly to the one or more VM 420A (i.e., without undergoing software processing by the one or more software processes 530A). In this example, one or more hardware modules HW A may be or comprise two or more devices, such as, one or more physical appliances, one or more offload engines, and/or one or more network services (e.g., of the types and/or configurations described previously in connection with FIGS. 1 to 3). Also in this example, the hardware processing that may be provided by one or more modules HW A may comprise forwarding the one or more traffic subsets 506A between or among these two or more devices. As alluded to earlier, in this example, interaction between the one or more modules HW A and the one or more VM 420A may be carried out and/or invoked, at least in part, via one or more physical and/or virtual functions (e.g., F1) that may be associated, at least in part, with the one or more hardware modules HW A and/or one or more VM 420A. Alternatively or additionally, such interaction may be carried out, at least in part, via the one or more dedicated ports of port circuitry 440. Additionally or alternatively, in this embodiment, engine 412 may facilitate allocation of one or more hardware modules HW A . . . N such that one or more hardware modules HW A . . . N may be allocated (1) in accordance with one or more policies associated with the traffic subset and/or associated workload, and/or (2) such that utilization level correspond to and/or conform to the one or more associated policies.

Additionally or alternatively, in this example, in the case in which the software processing is provided, at least in part, by the one or more processes 530A, such software processing may comprise respective software processing by two or more of the software processes (e.g., 530A, 530N). Additionally or alternatively, after undergoing such software processing, but prior to being provided to one or more VM 420A, one or more traffic subsets 506A may undergo further hardware processing and further software processing. In this case, the such further hardware and further software processing may be selected (e.g., in accordance with the one or more policies 413) in the same manner and/or as if the one or more subsets 506A were being presented (e.g., to the circuitry 118) for their first instance/time being processed by hardware and/or software processing (i.e., as if they had not previously been processed by any hardware module or software process). This may result in one or more subsets 506A undergoing the same type and/or manner of hardware and/or software processing as they had previously undergone.

In the above cases of this example, after each respective hardware and/or software processing is provided, the thus processed traffic subset 506A may be forwarded from the entity performing the respective processing back to (e.g., the one or more dedicated (and/or other) ports) of the switch 408 and/or 410. The switch 408 and/or 410 may then forward the thus again received traffic subset 506A to its subsequent processing hardware or software processing entity for processing. In this embodiment, the switch 408 and/or 410 may consult policies and/or other information provided in-band, in packet headers, and/or by the one or more SDN controllers, cloud operating systems, VMM 414, and/or vSwitch 416, to determine and/or control, at least in part, order and/or sequence of these hardware and/or software processings.

Additionally or alternatively, although ultimate control of the processing of one or more traffic subsets 506A and/or selection of applicable policies may remain with one or more VMM 414, vSwitch 416, and/or one or more other software processes 530A . . . 530N, depending upon the situation, active/immediate processing control of and/or changing of one or more policies 413 may transition between one or more VMM 414, vSwitch 416, and/or one or more other software processes 530A . . . 530N, on the one hand, and one or more host processors/central processing units/chipsets 406 and/or circuitry 118 (and/or one or more components thereof), on the other hand. For example, one or more host processors/central processing units/chipsets 406 and/or circuitry 118 (and/or one or more components thereof) may request permission for such active/immediate processing control, etc. from one or more VMM 414, vSwitch 416, and/or one or more other software processes 530A . . . 530N, or vice versa.

For example, one or more host processors/central processing units/chipsets 406 and/or circuitry 118 (and/or one or more components thereof) may facilitate, at least in part, change in such processing control and/or applicable policy for the one or more subsets 506A between such hardware (e.g., one or more host processors/central processing units/chipsets 406 and/or circuitry 118, and/or one or more components thereof), on the one hand, and one or more VMM 414, vSwitch 416, and/or one or more other software processes 530A . . . 530N, on the other hand. Such change may be initiated, implemented, and/or commanded, at least in part, by one or more VMM 414, vSwitch 416, and/or one or more other software processes 530A . . . 530N. However, such change may be in response, at least in part, to one or more requests for same and/or information 460 provided, at least in part, by one or more host processors/central processing units/chipsets 406 and/or circuitry 118, and/or one or more components thereof, and/or based upon information contained in one or more packets and/or their headers, to one or more VMM 414, vSwitch 416, and/or one or more other software processes 530A . . . 530N. For example, such information may be or comprise, at least in part, information related to and/or indicating the current state of processing and/or contents of the one or more subsets 506A. For example, information/request 460 may result and/or be derived, at least in part, from deep (and/or other) packet inspection that may be comprised in and/or implemented by the hardware and/or software processing that may be imparted to one or more subsets 506A. Such information/request 460 may indicate and/or permit one or more VMM 414, vSwitch 416, and/or one or more other software processes 530A . . . 530N to determine, at least in part, that such change may be appropriate to permit one or more subsets 506A to be properly processed. Based upon such information/request 406, such change may be initiated and/or implemented, at least in part. Such packet inspection may be related to and/or facilitate, at least in part, determination of access rights (e.g., to one or more platforms 402 and/or components thereof by one or more subsets 506A and/or one or more programs implicated by one or more subsets 506A), detection of one or more unauthorized programs (e.g., that may be associated, at least in part, with and/or implicated by one or more subsets 506A), and/or other types and/or forms of network security. Additionally or alternatively, such information 406 may be used to determine, at least in part, (1) access to protected space 434, to change, at least in part, (2) order of execution of or type of processing to be imparted to the respective traffic subset, and/or (3) to determine, at least in part, (e.g., by switch 408, one or more hardware modules A . . . N, one or more VMM 414, vSwitch 416, and/or one or more VM 420A . . . 420N, one or more locations for such processing. One or more policies 413 and/or 415 may comprise, at least in part, such information 406 that may be used to determine ordering of execution of and/or type of processing, and/or manner of changing such processing.

Thus, based at least in part upon this information/request 406 (and/or other information and/or parameters), one or more VMM 414, vSwitch 416, and/or one or more other software processes 530A . . . 530N may be capable of controlling actual access to and/or allocation of one or more host processors/central processing units/chipsets 406 and/or circuitry 118, and/or one or more components thereof to the one or more subsets 506A. Additionally or alternatively, such access control may permit one or more VMM 414, vSwitch 416, and/or one or more other software processes 530A . . . 530N to restrict and/or control access to one or more host processors/central processing units/chipsets 406 and/or circuitry 118, and/or one or more components thereof, such that such actual access is only permitted to occur after both (1) allocation of one or more host processors/central processing units/chipsets 406 and/or circuitry 118, and/or one or more components thereof to the one or more subsets 506A has occurred, and (2) the one or more policies 413 have been provided to the one or more host processors/central processing units/chipsets 406 and/or circuitry 118, and/or one or more components thereof.

In this embodiment, one or more software processes 530A . . . 530N may be capable of detecting and/or correcting, at least in part, one or more errors introduced/imparted into the one or more subsets 506A by hardware processing (e.g., as a result of one or more hardware bugs that may be present in one or more host processors/central processing units/chipsets 406 and/or circuitry 118, and/or one or more components thereof (e.g., one or more modules HW A . . . HW N). Additionally, as can be readily discerned from the foregoing, in this embodiment, the respective operations performed by one or more VMM 414, vSwitch 416, and/or one or more other software processes 530A . . . 530N, on the one hand, and by the one or more host processors/central processing units/chipsets 406 and/or circuitry 118, and/or one or more components thereof, on the other hand, may be coordinated, at least in part, so as to process the one or more workloads 502A . . . 502N in conformity with one or more environments 470 facilitated, at least in part, by the one or more policies 413. In this embodiment, as discussed above, one or more workloads 502A . . . 502N, and/or the processing thereof, may be related, at least in part, to network traffic processing.

Program instructions/code may be comprised in space 434 may be used to correct and/or ameliorate such hardware bugs (e.g., without having to resort to further changes/fixes). In this case, the hardware in environment 470 that may be intended to implement such correction may be provisioned to include one or more privileged interfaces that may be capable of accessing such code in space 434.

Thus, in a first example in this embodiment, an apparatus is provided that may be used in association, at least in part, with a network environment. The apparatus may comprise circuitry that may satisfy one or more of the following options (a) to (d).

In option (a) in this first example, in response, at least in part, to allocation of at least one workload to at least one platform by at least one software process (e.g., that may be local to, at least in part, or remote, at least in part, from the circuitry), the circuitry may provide, at least in part, to the at least one platform, at least one policy that may be associated, at least in part, with the at least one workload. The at least one policy may have been previously provided, at least in part, to the circuitry by the at least one software process. Also in option (a) in this first example, the circuitry may initiate, at least in part, execution of the at least one workload by the at least one platform.

In option (b) of this first example, in response, at least in part, to traffic processing control that may be based, at least in part, upon at least one determination made, at least in part, by the at least one software process, the circuitry may issue at least one command that may result, at least in part, in at least one traffic subset being processed by hardware of the at least one platform. The at least one software process may provide to the hardware at least one portion of at least one other policy that may be associated, at least in part, with the at least one traffic subset.

In option (c) of this first example, the at least one command may result, at least in part, in one or more of the following sub-options (1) to (4). In sub-option (1), the hardware may receive the at least one traffic subset directly from port circuitry of at least one switch. In sub-option (2), hardware processing may be imparted, at least in part, by the hardware, to the at least one traffic subset in accordance with the at least one policy. In sub-option (3), after the hardware processing, the at least one traffic subset may undergo software processing and then may be provided to at least one virtual machine. In sub-option (4), after the hardware processing, the at least one traffic subset may be provided directly to the at least one virtual machine.

In option (d) of this first example, the circuitry may facilitate, at least in part, change in processing control for the at least one traffic subset between the hardware and the at least one software process. The change may be initiated, at least in part, by the at least one software process. The hardware may be capable of providing information and/or a request. The at least one software process may initiate, in response at least in part to the information and/or the request, the change. The at least one software process may be capable of modifying, at least in part, the at least one policy, the at least one policy, and/or resource allocation related (e.g., the resources allocated) to processing the at least one traffic subset, and/or processing order of the at least one traffic subset.

In a second example in this embodiment that may comprise some or all of the elements of the first example, the circuitry may satisfy option (a). Additionally in this second example, the at least one workload may comprise, at least in part, at least one network traffic flow, at least one group of network traffic flows, at least one portion of virtual machine-associated network traffic, the at least one virtual machine, and/or at least one portion of application/project-associated network traffic. The at least one workload may implement at least one of the following processing types: compute processing, network processing, security processing, storage processing, and/or energy consumption-related processing. The at least one policy may be based, at least in part, upon implementation information supplied, at least in part, by at least one infrastructure administrator and/or at least one end user of the circuitry.

In a third example of this embodiment that may comprise some or all of the elements of either the first or the second examples, the circuitry may satisfy option (b). Additionally in this third example, the at least one command may result, at least in part, in at least one allocation change. The at least one allocation change may be related, at least in part, to at least one migration. The at least one allocation change may comprise at least one hardware allocation, at least one software allocation, and/or at least one virtual machine allocation. In this third example, the at least one migration may comprise at least one hardware migration, at least one software migration, at least one virtual machine migration, at least one storage migration, at least one platform migration, at least one network migration, and/or at least one compute entity migration. Also in this third example, the at least one software process may comprise at least one virtual machine monitor process, the at least one virtual switch process, at least one storage control process, at least one power control process, at least one network control process, and/or at least one compute control process.

In a fourth example in this embodiment that may comprise some or all of the elements of any of the preceding examples, the circuitry may satisfy option (c). Also in this fourth example, the hardware may comprise at least two devices. The at least two devices may be or comprise at least one physical appliance, at least one offload engine, and/or at least one network service. The hardware processing may comprise forwarding of the at least one traffic subset between the at least two devices. The hardware may interact, at least in part, with the at least one virtual machine via at least one virtual function that may be associated, at least in part, with the hardware, at least one dedicated port of the hardware that may be associated with the at least one virtual machine, and/or at least one physical function that may be associated, at least in part, with the hardware. The software processing may be implemented, at least in part, by at least two software processes.

In a fifth example in this embodiment that may comprise some or all of the elements of the fourth example, after undergoing the software processing, and prior to being provided to the at least one virtual machine, the at least one traffic subset may undergo further hardware processing and further software processing. The further hardware processing and the further software processing may be selected in a manner as if the at least one traffic subset is being presented for a first time to the hardware and to the at least two software processes.

In a sixth example in this embodiment that may comprise some or all of the elements of any of the preceding examples, the circuitry may satisfy option (d). Also in this sixth example, the hardware may implement, at least in part, packet inspection of the at least one traffic subset. The packet inspection may be related, at least in part, to associating traffic with one or more policies, one or more associated tenants/projects/applications, access rights determination, unauthorized program detection, the processing order of the at least one traffic subset, and/or the processing set (e.g., the particular processing operations, processing sequence, and/or hardware and/or software, etc. to be used to process the at least one traffic subset) to be provided to the at least one traffic subset, and/or network security. The circuitry may comprises at least one protected memory space that may protected from access and control by a virtual machine monitor. The at least one protected memory space may (but is not required) be used to provide additional processing to the at least one traffic subset.

In a seventh example in this embodiment that may comprise some or all of the elements of any of the preceding examples, the apparatus may be implemented such that (1) the at least one software process may be capable of controlling access to and allocation of the hardware, (2) the at least one software process may permit the access to the hardware only after both the allocation of hardware and the at least one policy has been provided to the hardware, and/or the at least one software process may be capable of correcting an error in the at least one traffic subset that may be imparted to the at least one traffic subset by the hardware processing.

In an eighth example in this embodiment that may comprise some or all of the elements of any of the preceding examples, the at least one workload may be related, at least in part, to network traffic processing. Respective operations of the at least one software process and the hardware may be coordinated, at least in part, so as to process the at least one workload in conformity with a multi-tenant environment that may be facilitated, at least in part, by the at least policy.

In a ninth example of this embodiment, computer-readable memory is provided that stores one or more instructions that when executed by a machine results in the performance of operations that may comprise (1) the operations that may be performed by the circuitry of the apparatus, and/or (2) any combination of any of the operations performed by the circuitry and/or apparatus in any of the preceding examples. In a tenth example of this embodiment, a method is provided that may be implemented, at least in part, in a network environment. The method may comprise (1) the operations that may be performed by the circuitry of the apparatus, (2) any combination of any of the operations performed by the circuitry and/or apparatus in any of the preceding examples, and/or (3) any combination of any of the operations that may be performed by execution of the one or more instructions stored in the computer-readable memory of the ninth example of this embodiment.

In an eleventh example of this embodiment, means may be provided to carry out any of, and/or any combination of, the operations that may be performed by the method, apparatus, computer-readable memory, and/or circuitry in any of the preceding examples.

Advantageously, in this embodiment, vSwitch and/or other software processes (e.g., hypervisor and/or virtual machine monitoring processes) may be able to directly affect and/or control packet processing by the hardware, without suffering from the types of disadvantages that conventional SR-IOV-based techniques may encounter. Advantageously, in this embodiment, this may preserve the ability to add local control, services, and/or polices, and to coordinate their addition/provision with the hypervisor, virtual machine manager, vSwitch, and/or one or more central and/or remote entities (e.g., one or more cloud operating systems and/or SDN controllers) that may control/management/supervise, a plurality of platforms. Further advantageously, in this embodiment, vSwitch, other software processes, and/or policies may be involved, at least in part, in the steering of packets to and/or among processing entities, and/or in the control, adaptation, and/or modification of such steering and/or processing (e.g., in a dynamic fashion and/or based upon changed processing criteria, parameters, preferences, etc.). This may increase processing flexibility and/or services that may be provided in this embodiment. Further advantageously, in this embodiment, services may be provided on a per-virtual machine and/or per-flow basis, and software processes may have the ability to modify, combine, and/or tailor hardware processing/capabilities as appropriate given dynamically changing circumstances, based upon packet inspection, etc.

Many alternatives, modifications, and/or variations are possible without departing from this embodiment. For example, in a twelfth example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Also, for example, without departing from this embodiment, one or more VM 420A . . . 420N, vSwitch 416, VMM 414, and/or software processes 530A . . . 530N may be executed, at least in part, by one or more host processors/central processing units/chipsets 406 and/or circuitry 118 (and/or one or more other components) in one or more platforms 402. In this embodiment, one or more vSwitch processes 416 may be or comprise, at least in part, open source Open vSwitch Version 2.0.0, made available Oct. 15, 2013 (and/or other versions thereof), by the Open vSwitch Organization, and/or other virtual switch software (e.g., manufactured by VMware, Inc., of Palo Alto, Calif., U.S.A., and/or others).

Also, for example, in the first example of this embodiment, the at least one software process may be remote, at least in part, from the circuitry. The at least one policy and/or placement of the at least one workload may be related, at least in part, to network computing and/or storage that may have been associated, at least in part, with at least one project by the at least one policy. The placement and/or the resource allocation (e.g., related at least in part to the foregoing) may be modified, at least in part, to accommodate, at least in part, the at least one project (e.g., to accommodate, at least in part, one or more parameters and/or requirements of the at least one project). In this embodiment, a project may be, comprise, and/or be related to, at least in part, workloads that may be related to, utilize, be associated with, and/or be allocated to, at least in part, one or more common platforms, resources, instrumentalities, software processes, hardware entities, and/or one or more portions thereof. Many other alternatives, modifications, and/or variations are possible without departing from this embodiment.

What is claimed is:

1. An apparatus to be used in association, at least in part, with a network environment, the apparatus comprising:
    circuitry satisfying at least one of the following subparagraphs (a) to (d):
        (a) in response, at least in part, to allocation of at least one workload to at least one platform by at least one software process, the circuitry (1) to provide, at least in part, to the at least one platform, at least one policy associated, at least in part, with the at least one workload, the at least one policy having been previously provided, at least in part, to the circuitry by the at least one software process, and (2) to initiate, at least in part, execution of the at least one workload by the at least one platform;
        (b) in response, at least in part, to traffic processing control that is based, at least in part, upon at least one determination made, at least in part, by the at least one software process, the circuitry to issue at least one command that results, at least in part, in at least one traffic subset being processed by hardware of the at least one platform, the at least one software process to provide to the hardware at least one portion of at least one other policy that is associated, at least in part, with the at least one traffic subset;
        (c) the at least one command to result, at least in part, in one or more of: (1) the hardware receiving the at least one traffic subset directly from port circuitry of at least one switch, (2) hardware processing by the hardware, at least in part, of the at least one traffic subset in accordance with the at least one policy, (3) after the hardware processing, the at least one traffic subset undergoing software processing and then being provided to at least one virtual machine, and (4) after the hardware processing, the at least one traffic subset being provided directly to the at least one virtual machine; and
        (d) the circuitry to facilitate, at least in part, change in processing control for the at least one traffic subset between the hardware and the at least one software process, the change being initiated, at least in part, by the at least one software process, the hardware being capable of providing at least one of information and a request, the at least one software process to initiate, in response at least in part to the at least one of the information and the request, the change, the at least one software process being capable of modifying, at least in part, at least one of: the at least one policy, resource allocation related to processing the at least one traffic subset, and processing order of the at least one traffic subset;
    wherein:
        the circuitry satisfies at least the subparagraph (c);
        the hardware comprises at least two devices selected from;
            at least one physical appliance;
            at least one offload engine; and
            at least one network service; and
        the hardware processing comprises forwarding the at least one traffic subset between the at least two devices.

2. The apparatus of claim 1, wherein:
    the circuitry satisfies the subparagraph (a);
    the at least one workload comprises, at least in part, at least one of:
        at least one network traffic flow;
        at least one group of network traffic flows;
        at least one portion of virtual machine-associated network traffic;
        the at least one virtual machine; and
        at least one portion of application/project-associated network traffic;
    the at least one workload is to implement at least one of the following processing types: compute processing, network processing, security processing, storage processing, and energy consumption-related processing; and
    the at least one policy is based, at least in part, upon implementation information supplied, at least in part, by at least one infrastructure administrator and at least one end user of the circuitry.

3. The apparatus of claim 1, wherein:
    the circuitry satisfies the subparagraph (b);
    the at least one command results, at least in part, in at least one allocation change, the at least one allocation change being related, at least in part, to at least one migration, the at least one allocation change comprising at least one of:
- at least one hardware allocation;
- at least one software allocation; and
- at least one virtual machine allocation;

the at least one migration comprising at least one of:
- at least one hardware migration;
- at least one software migration;
- at least one virtual machine migration;
- at least one storage migration;
- at least one platform migration;
- at least one network migration; and
- at least one compute entity migration; and the at least one software process comprises at least one of:
- at least one virtual machine monitor process;
- the at least one virtual switch process;
- at least one storage control process;
- at least one power control process;
- at least one network control process; and
- at least one compute control process.

4. The apparatus of claim 1, wherein:
the hardware is to interact, at least in part, with the at least one virtual machine via at least one of:
- at least one virtual function associated, at least in part, with the hardware;
- at least one dedicated port of the hardware that is associated with the at least one virtual machine; and
- at least one physical function associated, at least in part, with the hardware; and the software processing is implemented, at least in part, by at least two software processes.

5. The apparatus of claim 4, wherein:
after undergoing the software processing, and prior to being provided to the at least one virtual machine, the at least one traffic subset undergoes further hardware processing and further software processing, the further hardware processing and the further software processing being selected in a manner as if the at least one traffic subset is being presented for a first time to the hardware and to the at least two software processes.

6. The apparatus of claim 1, wherein:
the circuitry satisfies the subparagraph (d);
the hardware is to implement, at least in part, packet inspection of the at least one traffic subset, the packet inspection being related, at least in part, to at least one of:
- access rights determination;
- unauthorized program detection;
- the processing order;
- a processing set to be provided to the at least one traffic subset; and
- network security; and the circuitry comprises at least one protected memory space that is protected from access and control by a virtual machine monitor, the at least one protected memory space being used to provide additional processing to the at least one traffic subset.

7. The apparatus of claim 1, wherein the apparatus satisfies at least one of the following:
the at least one software process is capable of controlling access to and allocation of the hardware;
the at least one software process is to permit the access to the hardware only after both the allocation of hardware and the at least one policy has been provided to the hardware; and the at least one software process is capable of correcting an error in the at least one traffic subset imparted to the at least one traffic subset by the hardware processing.

8. The apparatus of claim 1, wherein:
the at least one workload is related, at least in part, to network traffic processing;
respective operations of the at least one software process and the hardware are to be coordinated, at least in part, so as to process the at least one workload in conformity with a multi-tenant environment facilitated, at least in part, by the at least policy.

9. The apparatus of claim 1, wherein the apparatus satisfies at least one of the following:
the at least one software process is remote, at least in part, from the circuitry;
the at least one policy and placement of the at least one workload are related, at least in part, to network computing and storage that have been associated, at least in part, with a project by the at least one policy;
at least one of the placement and the resource allocation are to be modified, at least in part, to accommodate, at least in part, the project.

10. A method implemented, at least in part, in a network environment, the method comprising operations that satisfy at least one of the following subparagraphs (a) to (d):
(a) in response, at least in part, to allocation of at least one workload to at least one platform by at least one software process, (1) providing, at least in part, by circuitry, to the at least one platform, at least one policy associated, at least in part, with the at least one workload, the at least one policy having been previously provided, at least in part, to the circuitry by the at least one software process, and (2) initiating, at least in part, by the circuitry, execution of the at least one workload by the at least one platform;
(b) in response, at least in part, to traffic processing control that is based, at least in part, upon at least one determination made, at least in part, by the at least one software process, issuing, at least in part, by the circuitry, at least one command that results, at least in part, in at least one traffic subset being processed by hardware of the at least one platform, the at least one software process to provide to the hardware at least one portion of at least one other policy that is associated, at least in part, with the at least one traffic subset;
(c) the at least one command resulting, at least in part, in (1) the hardware receiving the at least one traffic subset directly from port circuitry of at least one switch, (2) hardware processing by the hardware, at least in part, of the at least one traffic subset in accordance with the at least one policy, (3) after the hardware processing, the at least one traffic subset undergoing software processing and then being provided to at least one virtual machine, and (4) after the hardware processing, the at least one traffic subset being provided directly to the at least one virtual machine; and
(d) facilitating, at least in part, by the circuitry, change in processing control for the at least one traffic subset between the hardware and the at least one software process, the change being initiated, at least in part, by the at least one software process, the hardware being capable of providing at least one of information and a request, the at least one software process to initiate, in response at least in part to the at least one of the information and the request, the change, the at least one software process being capable of modifying, at least in part, at least one of: the at least one policy, resource allocation related to processing the at least one traffic subset, and processing order of the at least one traffic subset;
wherein:
the circuitry satisfies at least the subparagraph (c);
the hardware comprises at least two devices selected from:
at least one physical appliance;
at least one offload engine; and
at least one network service; and
the hardware processing comprises forwarding the at least one traffic subset between the at least two devices.

11. The method of claim 10, wherein:
the method satisfies the subparagraph (a);
the at least one workload comprises, at least in part, at least one of:
at least one network traffic flow;
at least one group of network traffic flows;
at least one portion of virtual machine-associated network traffic;
the at least one virtual machine; and
at least one portion of application/project-associated network traffic;
the at least one workload is to implement at least one of the following processing types: compute processing, network processing, security processing, storage processing, and energy consumption-related processing; and
the at least one policy is based, at least in part, upon implementation information supplied, at least in part, by at least one infrastructure administrator and at least one end user of the circuitry.

12. The method of claim 10, wherein:
the method satisfies the subparagraph (b);
the at least one command results, at least in part, in at least one allocation change, the at least one allocation change being related, at least in part, to at least one migration, the at least one allocation change comprising at least one of:
at least one hardware allocation;
at least one software allocation; and
at least one virtual machine allocation;
the at least one migration comprising at least one of:
at least one hardware migration;
at least one software migration;
at least one virtual machine migration;
at least one storage migration;
at least one platform migration;
at least one network migration; and
at least one compute entity migration; and
the at least one software process comprises at least one of:
at least one virtual machine monitor process;
the at least one virtual switch process;
at least one storage control process;
at least one power control process;
at least one network control process; and
at least one compute control process.

13. The method of claim 10, wherein:
the hardware is to interact, at least in part, with the at least one virtual machine via at least one of:
at least one virtual function associated, at least in part, with the hardware;
at least one dedicated port of the hardware that is associated with the at least one virtual machine; and
at least one physical function associated, at least in part, with the hardware; and
the software processing is implemented, at least in part, by at least two software processes.

14. The method of claim 13, wherein:
after undergoing the software processing, and prior to being provided to the at least one virtual machine, the at least one traffic subset undergoes further hardware processing and further software processing, the further hardware processing and the further software processing being selected in a manner as if the at least one traffic subset is being presented for a first time to the hardware and to the at least two software processes.

15. The method of claim 10, wherein:
the method satisfies the subparagraph (d);
the hardware is to implement, at least in part, packet inspection of the at least one traffic subset, the packet inspection being related, at least in part, to at least one of:
access rights determination;
unauthorized program detection;
the processing order;
a processing set to be provided to the at least one traffic subset; and
network security; and
the circuitry comprises at least one protected memory space that is protected from access and control by a virtual machine monitor, the at least one protected memory space being used to provide additional processing to the at least one traffic subset.

16. The method of claim 10, wherein the apparatus satisfies at least one of the following:
the at least one software process is capable of controlling access to and allocation of the hardware;
the at least one software process is to permit the access to the hardware only after both the allocation of hardware and the at least one policy has been provided to the hardware; and
the at least one software process is capable of correcting an error in the at least one traffic subset imparted to the at least one traffic subset by the hardware processing.

17. The method of claim 10, wherein:
the at least one workload is related, at least in part, to network traffic processing;
respective operations of the at least one software process and the hardware are to be coordinated, at least in part, so as to process the at least one workload in conformity with a multi-tenant environment facilitated, at least in part, by the at least policy.

18. Computer-readable memory storing one or more instructions that when executed by a machine result in performance of operations comprising at least one of the following subparagraphs (a) to (d):
(a) in response, at least in part, to allocation of at least one workload to at least one platform by at least one software process, (1) providing, at least in part, by circuitry, to the at least one platform, at least one policy associated, at least in part, with the at least one workload, the at least one policy having been previously provided, at least in part, to the circuitry by the at least one software process, and (2) initiating, at least in part, by the circuitry, execution of the at least one workload by the at least one platform;
(b) in response, at least in part, to traffic processing control that is based, at least in part, upon at least one determination made, at least in part, by the at least one software process, issuing, at least in part, by the circuitry, at least one command that results, at least in part, in at least one traffic subset being processed by hardware of the at least one platform, the at least one software process to provide to the hardware at least one portion of at least one other policy that is associated, at least in part, with the at least one traffic subset;

(c) the at least one command resulting, at least in part, in (1) the hardware receiving the at least one traffic subset directly from port circuitry of at least one switch, (2) hardware processing by the hardware, at least in part, of the at least one traffic subset in accordance with the at least one policy, (3) after the hardware processing, the at least one traffic subset undergoing software processing and then being provided to at least one virtual machine, and (4) after the hardware processing, the at least one traffic subset being provided directly to the at least one virtual machine; and (d) facilitating, at least in part, by the circuitry, change in processing control for the at least one traffic subset between the hardware and the at least one software process, the change being initiated, at least in part, by the at least one software process, the hardware being capable of providing at least one of information and a request, the at least one software process to initiate, in response at least in part to the at least one of the information and the request, the change, the at least one software process being capable of modifying, at least in part, at least one of: the at least one policy, resource allocation related to processing the at least one traffic subset, and processing order of the at least one traffic subset;

wherein:
the circuitry satisfies at least the subparagraph (c);
the hardware comprises at least two devices selected from:
at least one physical appliance;
at least one offload engine; and
at least one network service; and
the hardware processing comprises forwarding the at least one traffic subset between the at least two devices.

19. The computer-readable memory of claim 18, wherein:
the computer-readable memory satisfies the subparagraph (a);
the at least one workload comprises, at least in part, at least one of:
at least one network traffic flow;
at least one group of network traffic flows;
at least one portion of virtual machine-associated network traffic;
the at least one virtual machine; and
at least one portion of application/project-associated network traffic;
the at least one workload is to implement at least one of the following processing types: compute processing, network processing, security processing, storage processing, and energy consumption-related processing; and
the at least one policy is based, at least in part, upon implementation information supplied, at least in part, by at least one infrastructure administrator and at least one end user of the circuitry.

20. The computer-readable memory of claim 18, wherein:
the computer-readable memory satisfies the subparagraph (b);
the at least one command results, at least in part, in at least one allocation change, the at least one allocation change being related, at least in part, to at least one migration, the at least one allocation change comprising at least one of:
at least one hardware allocation;
at least one software allocation; and
at least one virtual machine allocation;

the at least one migration comprising at least one of:
at least one hardware migration;
at least one software migration;
at least one virtual machine migration;
at least one storage migration;
at least one platform migration;
at least one network migration; and
at least one compute entity migration; and
the at least one software process comprises at least one of:
at least one virtual machine monitor process;
the at least one virtual switch process;
at least one storage control process;
at least one power control process;
at least one network control process; and
at least one compute control process.

21. The computer-readable memory of claim 18, wherein:
the hardware is to interact, at least in part, with the at least one virtual machine via at least one of:
at least one virtual function associated, at least in part, with the hardware;
at least one dedicated port of the hardware that is associated with the at least one virtual machine; and
at least one physical function associated, at least in part, with the hardware; and
the software processing is implemented, at least in part, by at least two software processes.

22. The computer-readable memory of claim 21, wherein:
after undergoing the software processing, and prior to being provided to the at least one virtual machine, the at least one traffic subset undergoes further hardware processing and further software processing, the further hardware processing and the further software processing being selected in a manner as if the at least one traffic subset is being presented for a first time to the hardware and to the at least two software processes.

23. The computer-readable memory of claim 18, wherein:
the computer-readable memory satisfies the subparagraph (d);
the hardware is to implement, at least in part, packet inspection of the at least one traffic subset, the packet inspection being related, at least in part, to at least one of:
access rights determination;
unauthorized program detection; and
network security; and
the circuitry comprises at least one protected memory space that is protected from access and control by a virtual machine monitor, the at least one protected memory space being used to provide additional processing to the at least one traffic subset.

24. The computer-readable memory of claim 18, wherein the apparatus satisfies at least one of the following:
the at least one software process is capable of controlling access to and allocation of the hardware;
the at least one software process is to permit the access to the hardware only after both the allocation of hardware and the at least one policy has been provided to the hardware; and
the at least one software process is capable of correcting an error in the at least one traffic subset imparted to the at least one traffic subset by the hardware processing.

25. The computer-readable memory of claim 18, wherein:
the at least one workload is related, at least in part, to network traffic processing;
respective operations of the at least one software process and the hardware are to be coordinated, at least in part, so as to process the at least one workload in conformity with a multi-tenant environment facilitated, at least in part, by the at least policy.

* * * * *